US009869291B2

(12) United States Patent
Fiske

(10) Patent No.: US 9,869,291 B2
(45) Date of Patent: Jan. 16, 2018

(54) SYSTEM AND METHOD FOR STORING ENERGY

(71) Applicant: Gravity Power LLC, Goleta, CA (US)

(72) Inventor: O. James Fiske, Goleta, CA (US)

(73) Assignee: GRAVITY POWER LLC, Goleta, CA (US)

( * ) Notice: Subject to any disclaimer, the term of this patent is extended or adjusted under 35 U.S.C. 154(b) by 486 days.

(21) Appl. No.: 14/465,736

(22) Filed: Aug. 21, 2014

(65) Prior Publication Data
US 2015/0056085 A1 Feb. 26, 2015

Related U.S. Application Data

(60) Provisional application No. 61/868,927, filed on Aug. 22, 2013.

(51) Int. Cl.
F15B 1/04 (2006.01)
F03B 13/06 (2006.01)
(Continued)

(52) U.S. Cl.
CPC .......... F03B 13/06 (2013.01); E02B 9/00 (2013.01); E02B 9/06 (2013.01); F03B 11/006 (2013.01);
(Continued)

(58) Field of Classification Search
CPC ............ F15B 1/045; F15B 2201/215; F15B 2201/312; F15B 1/022; F15B 1/24
See application file for complete search history.

(56) References Cited

U.S. PATENT DOCUMENTS 1,582,985 A * 5/1926 Hanel ................... F15B 1/045
138/31
4,147,204 A * 4/1979 Pfenninger ............ B65G 5/00
165/4
(Continued)

FOREIGN PATENT DOCUMENTS

CN 101260857 9/2008
JP 2007-204218 8/2007
WO WO-2011/114199 9/2011

OTHER PUBLICATIONS

International Search Report and Written Opinion dated Dec. 15, 2014, from related international application No. PCT/US2014/052187.
International Preliminary Report on Patentability dated Mar. 3, 2016, from related international application No. PCT/US2014/052187.
(Continued)

Primary Examiner — F. Daniel Lopez
(74) Attorney, Agent, or Firm — Foley & Lardner LLP

(57) ABSTRACT

A system for storing energy includes a body and a shaft having walls defining an internal volume for containing a fluid, a seal member disposed between the body and the walls of the shaft, and a fluid passage in fluid communication with the shaft. The body is disposed within the internal volume of the shaft for movement with gravity from a first elevation position to a second elevation position within the internal volume of the shaft. The seal member divides the internal volume into a first portion located below the body and a second portion located above the body. The fluid passage communicates fluid with the first portion of the interior volume of the shaft. The system further includes a pump/turbine operatively coupled with the fluid passage to drive a motor/generator to generate electricity upon movement of the body from the first elevation position to the second elevation position.

18 Claims, 26 Drawing Sheets

(51) Int. Cl.
*F03B 11/00* (2006.01)
*E02B 9/00* (2006.01)
*E02B 9/06* (2006.01)

(52) U.S. Cl.
CPC ....... *F05B 2240/57* (2013.01); *F05B 2260/42* (2013.01); *F15B 1/045* (2013.01); *F15B 2201/312* (2013.01); *Y02E 10/22* (2013.01); *Y02E 10/226* (2013.01); *Y02E 60/17* (2013.01); *Y10T 29/49236* (2015.01)

(56) References Cited

U.S. PATENT DOCUMENTS

| | | | | |
|---|---|---|---|---|
| 4,845,376 | A * | 7/1989 | Bendiks | F03B 13/00 290/1 R |
| 2006/0123778 | A1 | 6/2006 | Huynh | |
| 2012/0134790 | A1 | 5/2012 | Fiske | |
| 2013/0174725 | A1* | 7/2013 | Heindl | F03B 17/00 92/77 |
| 2014/0042753 | A1* | 2/2014 | Bahner | F03B 13/06 290/1 R |

OTHER PUBLICATIONS

Chinese Office Action dated Jun. 2, 2017, from application No. 201480050099.4.
Extended European Search Report dated Feb. 28, 2017, from application No. 14837373.1.
Australian Examination Report dated Aug. 21, 2017, from application No. 2014308692.

* cited by examiner

SYSTEM AND METHOD FOR STORING ENERGY

CROSS-REFERENCE TO RELATED PATENT APPLICATIONS

This application claims priority from Provisional U.S. Application 61/868,927, filed Aug. 22, 2013, which is incorporated herein by reference in its entirety.

BACKGROUND

Providing adequate energy to power all the various needs of society is becoming more problematic every year. Conventional sources such as coal, petroleum and natural gas are becoming more expensive and harder to find. At the same time, the byproducts of combustion produce air pollution and elevate atmospheric carbon dioxide, threatening severe consequences for global environments. Renewable sources of energy, particularly solar collectors and wind turbines, could largely replace hydrocarbons if they could be converted from intermittent production to reliable, dispatchable power supplies. This could be accomplished by directing a significant fraction of the output from solar and/or wind sources into large-scale energy storage units, which would then release that energy as needed.

The primary technology currently in use for very high capacity energy storage is pumped storage hydro, also called simply "pumped hydro", as shown in FIG. 1. A typical installation 50 employs two large water reservoirs, with a first or low reservoir 52 at a lower elevation than a second or high reservoir 54. Hydraulic pump-turbines in a powerplant chamber 56 driven by a motor/generator pump water from the low reservoir 52 to the high reservoir 54 whenever excess energy is available. Upon demand, water is released from the high reservoir 54 and flows through the pump-turbines into the low reservoir 52 to generate electricity. Large installations can have a peak output power of more than 1000 megawatts and a storage capacity of thousands of megawatt-hours. The powerplant chamber 56 may include a separate pump and turbine both connected by drive shafts to a motor-generator. This arrangement can operate in the same fashion as the conventional design to store and release energy, but it provides another mode called the "hydraulic short circuit" that greatly increases flexibility.

Pumped hydro has been the premier bulk storage technology for decades, with over 120 gigawatts of generation capacity worldwide, but geographic, geologic and environmental constraints associated with reservoir design in addition to increased construction costs have made it much less attractive for future expansion. Thus, this technology is not a practical method to provide the wide applicability, terawatt generation capacity, low cost and environmental compatibility required to support a major conversion of the energy infrastructure from hydrocarbon to renewable sources of energy.

An alternative technology includes storing energy by using a pressurized fluid to elevate a piston in a hollow shaft. In systems with a large shaft and piston diameter, some construction techniques can produce large variations in shaft and/or piston circumference due to their limited control of tolerances. In order for a seal between the piston and the walls of the shaft to maintain the tight contact required for good seal performance, such variation in circumference would require corresponding dynamic variation in seal circumference as the piston moves up and down. This dynamic variation can be difficult to achieve with materials capable of handling high contact forces. Further, a rough contact surface for the seal can result in poor seal performance and fast seal wear. High pressure leakage past the seal through small passages in a rough contact surface can cause scouring of that surface, wearing away material and accelerating deterioration of the system.

SUMMARY

One embodiment of the invention relates to a system for storing energy, the system including a body, and a hollow shaft having walls defining an internal volume for containing a fluid. The body is disposed within the internal volume of the hollow shaft for movement with gravity from a first elevation position to a second elevation position within the internal volume of the hollow shaft. The system further includes a seal member disposed between the body and the walls of the hollow shaft. The seal member is coupled to a mounting surface and slidably engages a contact surface to divide the internal volume into a first portion located vertically below the body and a second portion located vertically above the body. The system further includes a fluid passage in fluid communication with the hollow shaft and an electrical energy motor/generator. The fluid passage communicates fluid with the first portion of the interior volume of the hollow shaft. The motor/generator is operatively coupled with the fluid passage to drive the electrical energy motor/generator to generate electricity upon movement of the body with gravity from the first elevation position to the second elevation position.

Another embodiment relates to a method for constructing a system for storing energy. The method includes excavating a hollow shaft to a desired shaft depth, the hollow shaft defined by a wall and a bottom; and forming a floor on the bottom of the hollow shaft. The method further includes forming a piston base on the floor of the hollow shaft and forming a piston side wall coupled to the piston base to a piston height that is less than the shaft depth. The piston base has a diameter that is less than the diameter of the hollow shaft. The piston side wall defines a hollow interior of the piston. The method further includes substantially filling the hollow interior of the piston with a filler material and forming a piston top coupled to the piston side wall to close the interior of the piston.

Another embodiment relates to a method for constructing a system for storing energy. The method includes excavating a hollow shaft to a first depth, the hollow shaft defined by a wall and a bottom and having a diameter. The method further includes excavating an annulus with an outer diameter equal to or larger than the diameter of the hollow shaft to a second depth to define a column and excavating a tunnel along the base of the column. The tunnel has a ceiling and a bottom and opens on either end into the annulus. The method further includes forming a first shaft floor portion in the tunnel on the tunnel bottom, and forming a first piston base portion in the tunnel on the first shaft floor portion. The first shaft floor portion has a width that is less than the width of the tunnel. The first piston base portion extends from the first shaft floor portion to the ceiling of the tunnel. The method further includes widening the tunnel, forming a second portion of a shaft floor in the tunnel on the tunnel bottom adjacent to the first portion, forming a second piston base portion in the tunnel on the second shaft floor portion adjacent to the first piston base portion, and continuing to widen the tunnel and form shaft floor portions and piston base portions until the column is entirely supported by the shaft floor portions and piston base portions. The method further includes forming a piston side wall coupled to the piston base and surrounding the column, and forming a piston top coupled to the piston side wall to close the interior of the piston.

These and other aspects will become apparent from the following drawings and detailed description of exemplary embodiments.

BRIEF DESCRIPTION OF THE DRAWINGS

Features, aspects, and advantages of the present invention will become apparent from the following description, appended claims, and the accompanying exemplary embodiments shown in the drawings, which are briefly described below.

DETAILED DESCRIPTION

The following detailed description is of the best presently contemplated mode of implementing embodiments of the invention. This description is not to be taken in a limiting sense, but is made merely for the purpose of illustrating general principles of embodiments of the invention. The scope of the invention is best defined by the appended claims.

Embodiments of the present invention relate to systems and methods for storing energy that may be used, for example, to store energy generated during "off-peak" periods (i.e., time periods during which energy demands are less heavy relative to "peak" periods) and/or energy generated from renewable sources, such as wind and the sun. In particular embodiments, methods and systems for storing energy are configured for operation on land. In other particular embodiments, methods and systems for storing energy are configured for operation in an aquatic environment, such as, but not limited to, in the ocean.

According to one embodiment, the energy demand of the "peak" period is considered to be about 50% higher than the energy demand of the off-peak period. According to other embodiments, the energy demand of the "peak" period can be defined at other suitable levels, including, but not limited to, about 100% or 200% higher than the energy demand of the off-peak period.

One aspect of the invention involves storing off-peak energy and/or renewable energy for use during peak periods. As such, according to embodiments of the invention, energy storage systems can serve as reliable, dispatchable power supplies, as well as intermittent production supplies. According to particular embodiments of the present invention, a significant portion of the output from solar and/or wind sources are directed into energy storage systems, which may then release that energy, for example, on an as-needed basis.

Gravity-Hydraulic Storage System

Figure 1:
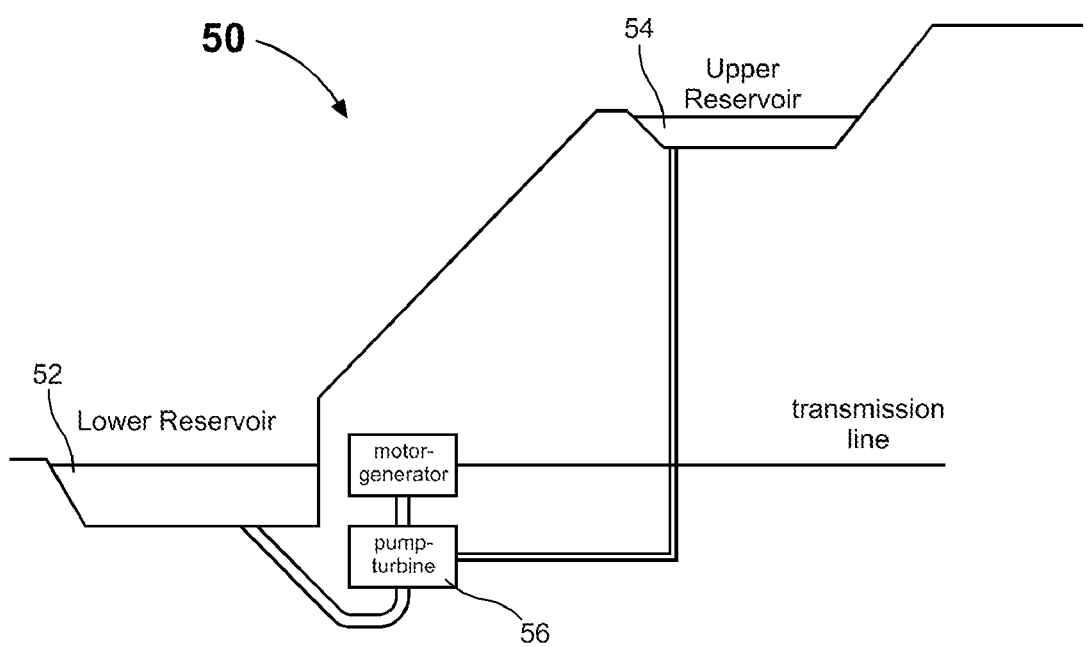
FIG. 1 is a schematic diagram of a conventional prior art pumped storage hydropower plant.
Figure 2:
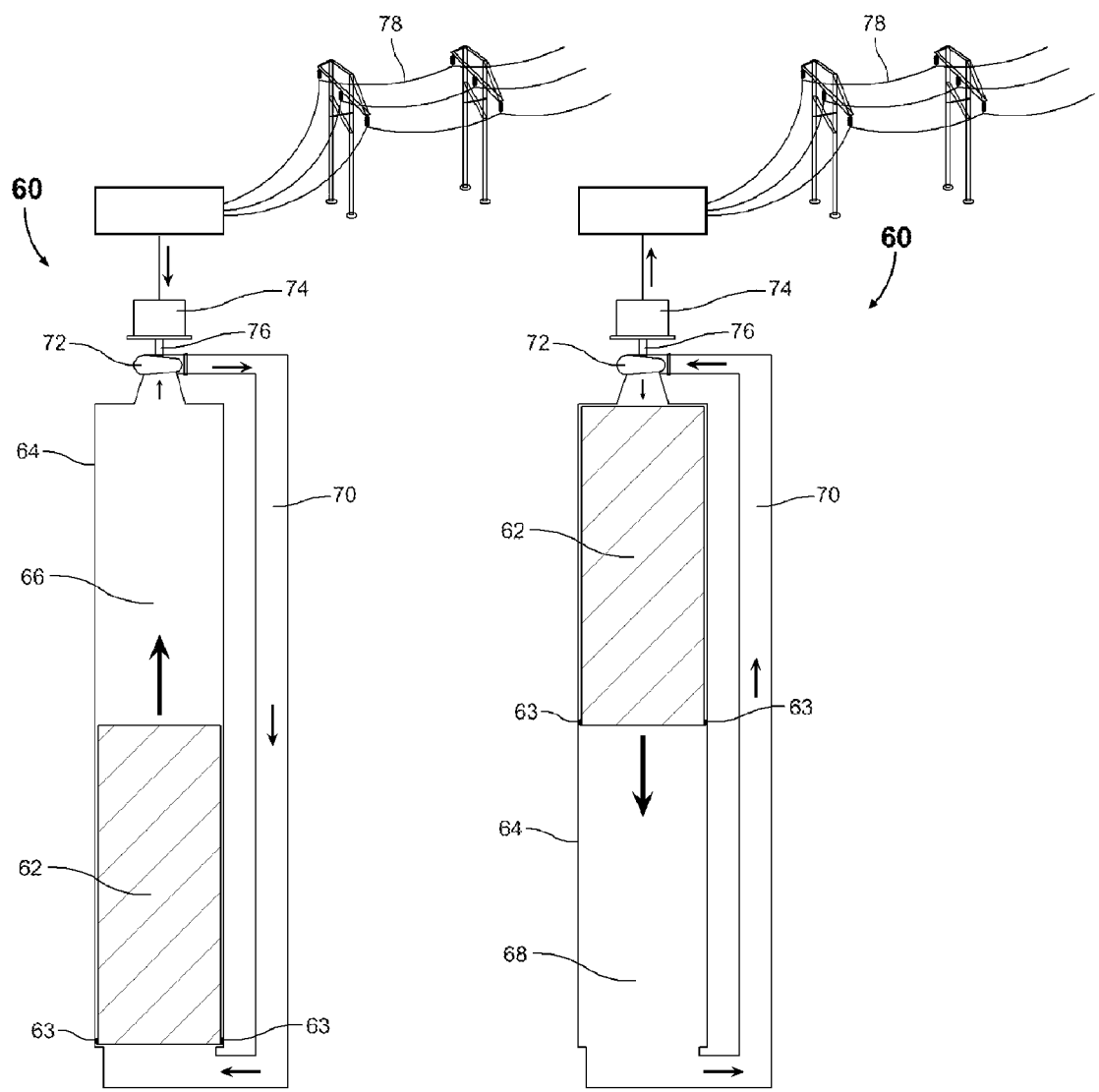
FIG. 2 is a schematic diagram of a gravity-hydraulic energy storage system as it stores energy and as it generates electric power.

Referring to FIG. 2, an energy storage system 60 for storing energy that avoids the constraints of pumped hydro while providing similar or better energy storage performance and economics, is shown. The energy storage system 60 may be similar in operation to the system for storing energy described in U.S. Pat. No. 8,166,760, entitled "System and Method for Storing Energy", issued May 1, 2012 to the present inventor, which is incorporated by reference herein in its entirety. The energy storage system 60 may be utilized to store off-peak or renewable energy, from sources such as wind or solar power.

The energy storage system 60 includes a body shown as a large piston 62 that is suspended in a hollow, vertical shaft 64 having an internal volume filled with a fluid. The piston 62 divides the internal volume of the shaft 64 into a first or upper chamber 66 above the piston 62 and a second or lower chamber 68 below the piston 62. The chambers 66 and 68 are in fluid communication with each other through a passage provided by a pipeline 70 (e.g., connecting pipe). As the piston 62 moves in the shaft 64, the volumes of the chambers 66 and 68 increase and decrease forcing the fluid between the chambers 66 and 68 through the pipeline 70. According to an exemplary embodiment, the piston 62 is a cylindrical body that is received in a shaft 64 that is similarly shaped. In other embodiments, the piston 62 and shaft may be otherwise shaped. A seal 63 is disposed between the piston 62 and the walls of the shaft 64. While the energy storage system 60 is shown in FIG. 2 as including only a single piston 62 and shaft 64, in other embodiments, the energy storage system 60 may include an array of several pistons and shafts and may include multiple passages connecting the chambers 66 and 68.

A pump-turbine 72 is disposed in the pipeline 70, such that fluid flowing through the pipeline 70 turns the pump-turbine 72. The pump-turbine 72 is mechanically coupled to an electric motor/generator 74, such as via a driveshaft 76. Energy to be stored in the energy storage system 60 is used to drive the electric motor/generator 74, rotating the pump-turbine 72 through the interconnection of the motor/generator 74, the driveshaft 76, and the pump-turbine 72. The pump-turbine 72 forces fluid through the pipeline 70 from the upper chamber 66 to the lower chamber 68, creating a higher pressure in the lower chamber 68 underneath the piston 62. The pressure differential lifts the piston 62 upwards, toward the top of the shaft 64, storing energy in the form of gravitational potential energy. The stored energy may be output from the energy storage system 60 by allowing the piston 62 to descend in the shaft 64. The weight of the piston forces fluid through the pipeline 70 from the lower chamber 68 to the upper chamber 66. The fluid flows through the pump-turbine 72, rotating the pump-turbine 72. The motor/generator 74 is driven through the interconnection of the motor/generator 74, the driveshaft 76, and the pump-turbine 72 to produce electric power. The electric power may be supplied, for example to the electric power grid 78.

Large Scale System

Figure 3:
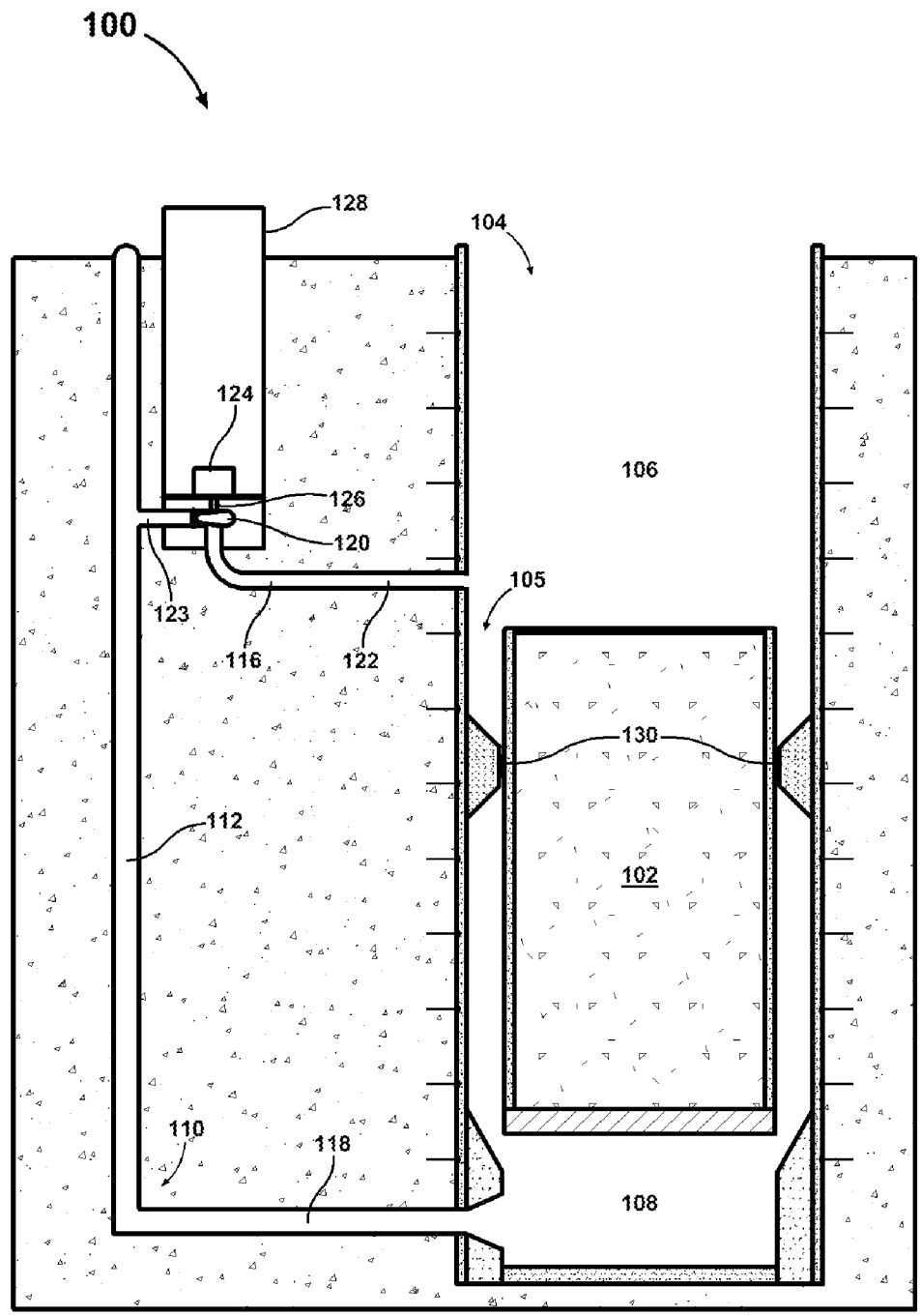
FIG. 3 is a cross-section view of a large-scale gravity-hydraulic energy storage system, according to an exemplary embodiment.

Referring to FIG. 3, a large scale energy storage system 100 for storing energy is shown. The energy storage system 100 operates similarly to the energy storage system 60 described above and includes a body, shown as a large piston 102 that is suspended in a deep vertical shaft 104 having an internal volume filled with a working fluid, such as water. The piston 102 is configured to have a relatively constant circumference along its height and a smooth, hard outer surface. The piston 102 divides the internal volume of the shaft 104 into a first or upper chamber 106 above the piston 102 and a second or lower chamber 108 below the piston 102. The chambers 106 and 108 are in fluid communication with each other through a passage 110. The passage 110 includes a vertical passage 112 (e.g., penstock). The vertical passage 112 is in communication with the upper chamber 106 through an upper cross passage 116 (e.g., tailrace) and in communication with the lower chamber 108 through a lower cross-passage 118. As the piston 102 moves in the shaft 104, the volumes of the chambers 106 and 108 increase and decrease, forcing the fluid between the chambers 106 and 108 through the passage 110. In other embodiments, the lower passage 108 may not be in fluid communication with the upper chamber 106 through the passage. Instead, the lower passage 108 may be in fluid communication with another source of un-pressurized fluid, such as a reservoir or tank provided proximate to the shaft 104.

A seal assembly 130 is provided surrounding the piston 102 and disposed in an annular space 105 between the piston 102 and the wall of the shaft 104. The seal assembly 130 is configured to prevent the flow of fluid around the piston 102 between the upper chamber 106 and the lower chamber 108. One of the outer wall of the piston 102 and the wall of the shaft 104 provides a mounting surface while the other surface provides a contact surface. The seal assembly 130 is coupled to the mounting surface and extends across the annular space 105 to slidably engage the contact surface. The wall of the shaft 104, the outer surface of the piston 102 and the seal assembly 130 are configured to prevent high pressure or particulates in the fluid from causing damage to the shaft 104, the piston 102, or the seal assembly 130 and to maximize the operational lifetime of the energy storage system 100. In the embodiment shown in FIG. 3, the seal assembly 130 is coupled to the wall of the shaft 104 and is stationary in the vertical direction, with the piston 102 configured to slide up and down past the seal assembly 130. In other embodiments, the seal assembly 130 may be mounted on the piston 102 and may be configured to slide up and down along the wall of the shaft 104.

A pump-turbine 120 is disposed in the upper cross passage 116, such that fluid flowing through the passage 110 turns the pump-turbine 120. The pump-turbine 120 separates the upper cross passage 116 into first portion 122 extending from the pump-turbine 120 to the upper chamber 106 and a second portion 123 extending from the pump-turbine 120 to the vertical passage 112. The pump-turbine 120 is a rotational device that is configured to operate as a pump when rotating in a first direction and as a turbine when rotating in a second, opposite direction. The pump-turbine 120 is mechanically coupled to an electric motor/generator 124, such as via a driveshaft 126. The pump-turbine 120 may be coupled to the driveshaft 126 via an intermediate member, such as a clutch or a torque converter to allow the pump-turbine 120 to be mechanically decoupled from the electric motor/generator 124. One or more of the pump-turbine 120, the electric motor/generator 124, and the driveshaft 126 may be housed in a facility, shown in FIG. 3 as a power house 128 that extends underground from the surface.

The motor/generator 124 is connected to an external source and destination for electric power, such as the electric power grid. Energy to be stored in the energy storage system 100 is used to drive the electric motor/generator 124, rotating the pump-turbine 120 through the interconnection of the motor/generator 124, the driveshaft 126, and the pump-turbine 120. The pump-turbine 120 forces fluid through the passage 110 from the upper chamber 106 to the lower chamber 108, creating a higher pressure in the lower chamber 108 underneath the piston 102. The pressure differential lifts the piston 102 upwards, toward the top of the shaft 104, storing energy in the form of gravitational potential energy. The stored energy may be output from the energy storage system 100 by allowing the piston 102 to descend in the shaft 104. The weight of the piston forces fluid through the passage 110 from the lower chamber 108 to the upper chamber 106. The fluid flows through the pump-turbine 120, rotating the pump-turbine 120. The motor/generator 124 is driven through the interconnection of the motor/generator 124, the driveshaft 126, and the pump-turbine 120 to produce electric power. The electric power may be supplied, for example to the electric power grid.

The relatively large size and vertical movement of the piston 102 and the relatively small drag losses because of the relatively modest speed of the piston 102 allows for substantial energy to be stored in the energy storage system 100. According to one exemplary embodiment, the shaft has a diameter of approximately 30 meters and a depth of approximately 500 meters and the piston has a height of approximately 250 meters and a volume of approximately 174,000 cubic meters. The piston 102 may be formed substantially from concrete, which has a negative buoyancy in water of approximately 1500 kg per cubic meter, providing a downward force of approximately 14700 Newtons. The energy (work) released by lowering one cubic meter of concrete through 1000 meters of elevation in water is:

$$W = \text{Force} \times \text{distance} = 14{,}700\ N \times 1{,}000\ m = 14.7\ \text{megajoules} = \sim 4.1\ \text{kilowatt-hours}$$

For a concrete piston with a volume of approximately 174,000 cubic meters moving through an elevation change of 250 meters, the resulting storage capacity exceeds 40 megawatt-hours.

Construction

Figure 4:
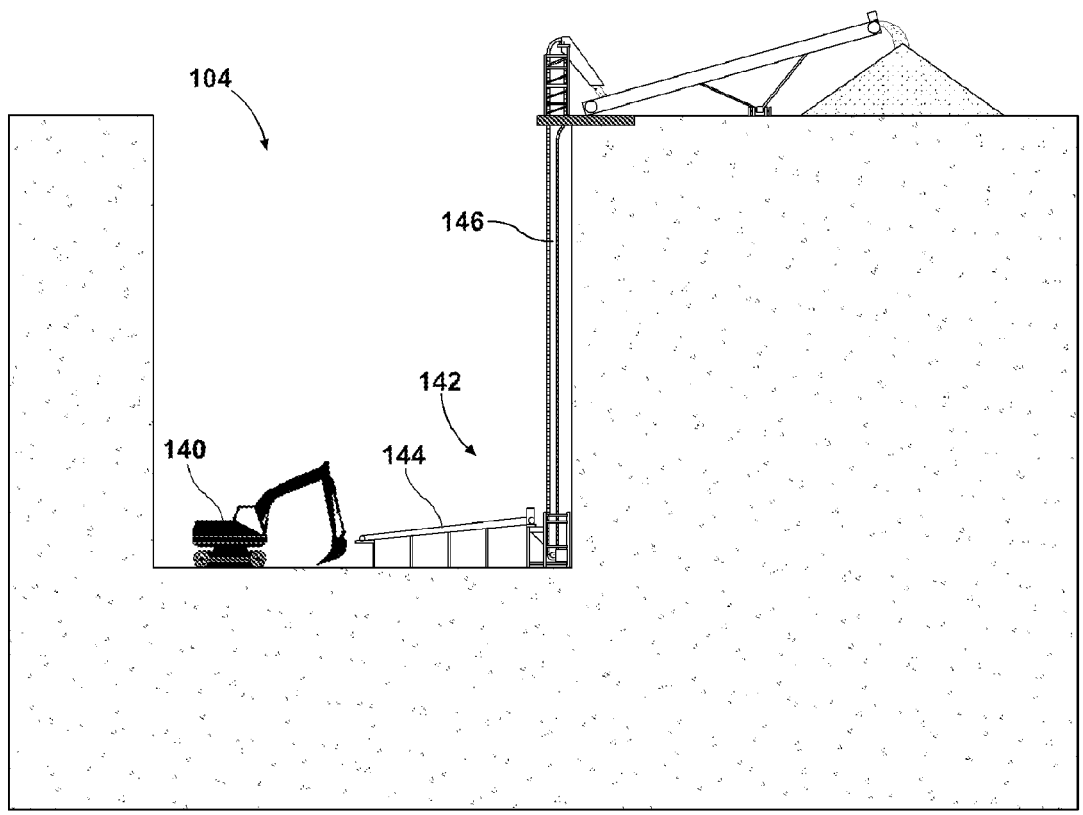
FIG. 4 is a cross-section view of the excavation of a shaft for the gravity-hydraulic energy storage system of FIG. 3, according to an exemplary embodiment.

The piston 102 and the shaft 104 are constructed with relatively simplified construction techniques to provide a broad power range for both energy storage and generation. Referring now to FIG. 4, the shaft 104 is shown being formed in bedrock, according to one exemplary embodiment. The shaft 104 may be formed by first drilling into the rock and loading the drilled holes with explosive material. The explosive material is detonated, fracturing the rock into pieces. The fractured rock fragments are loaded by an excavator 140 onto a conveyor 142, which transfers the rock fragments out of the shaft 104. The conveyer 142 may include both horizontal conveyers 144 and vertical conveyers 146. The rock fragments may be reduced in size by a rock crusher before being loaded onto the conveyer 142. The excavation process is continued until the shaft 104 reaches a depth that is sufficient for the requirements of the energy storage system 100.

Figure 5:
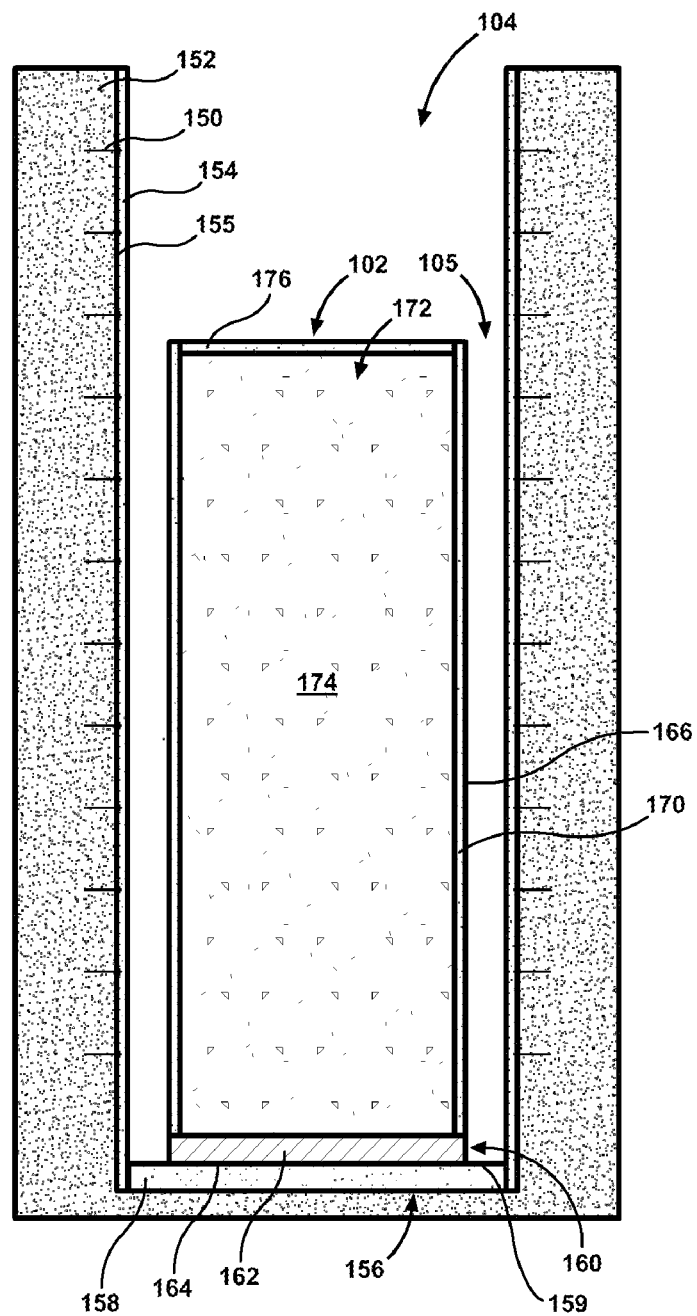
FIG. 5 is a cross-section view of a fabricated piston disposed in the shaft of FIG. 4, according to an exemplary embodiment.
Figure 6:
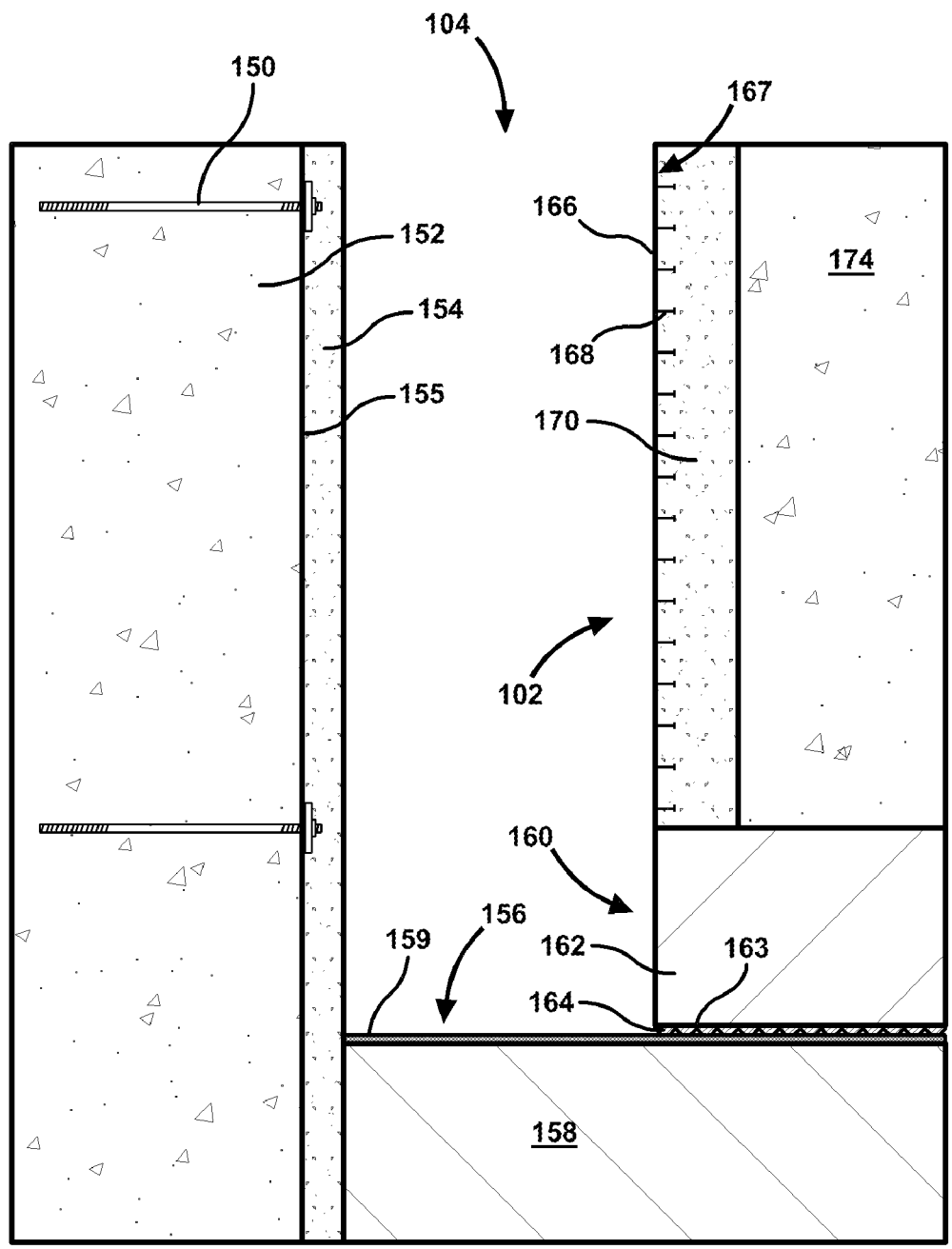
FIG. 6 is a detail cross-section view of the structure of the shaft floor, shaft wall and fabricated piston of FIG. 5.

Referring now to FIGS. 5 and 6, stabilizing devices, shown as rock bolts 150 may be embedded in the wall 152 to stabilize the surrounding rock, which may be fractured or otherwise weakened by the excavation. Additionally, a liner 154 may be coupled to the wall 152 to form a relatively hard, smooth surface. According to an exemplary embodiment, the liner 154 includes a wire mesh (e.g., welded wire mesh). The liner 154 may further include a filler sprayed over the shaft wall (e.g., shotcrete). A waterproof layer 155 formed by waterproof sheets may be provided between the liner 154 and the wall 152 to impede the passage of water either into or out of the shaft wall 152. In other embodiments, a waterproofing material may be added to the filler material of the liner 154 or otherwise applied to the shaft wall 152.

The liner 154 may be formed with a slip-forming process. The liner 154 may be installed starting from the bottom of the shaft 104 and working up to the top of the shaft 104, with reinforcement included in the liner 154 as necessary. In other embodiments the liner 154 may be formed with a formwork process to install the shaft liner 154 from the top of the shaft 104 to the bottom of the shaft 104. The liner 154 may be configured to have a relatively hard, smooth, vertical outer surface to provide a suitable sliding surface to facilitate the operation of the seal assembly 130 if the seal assembly 130 is coupled to the piston 102. As the piston 102 travels up and down inside the shaft 104, every point the seal assembly 130 passes on the liner 154 experiences large swings in fluid pressure. As the piston 102 rises, high pressure below the seal assembly 130 forces water into any cracks, pores or permeable material in the liner 154. When the piston 102 and the seal assembly 130 subsequently descend within the shaft 104, the water pressure adjacent to the shaft wall 152 drops. The liner 154 is configured to be relatively hard and free of voids into which high pressure water could be forced, thereby minimizing damage to the liner 154 that can occur when the high pressure water is forced back out of the liner 154. In other embodiments, the shaft 104 may not include separately formed liner and the native rock material forming the walls 152 may be prepared (e.g., polished, coated, sealed, etc.) to provide a relatively hard, smooth surface.

A floor 156 is provided at the bottom of the shaft 104. The floor 156 is configured to be capable of withstanding the pressures exerted by the piston 102 and the working fluid contained within the shaft 104. According to an exemplary embodiment, the floor 156 is formed of reinforced concrete and/or steel. For example, the floor 156 may include a concrete layer 158 and a steel plate 159 disposed on top of the concrete layer 158. The concrete layer 158 may be reinforced, such as with rebar or other strengthening members or additives (e.g., particles, fibers, etc.) provided within the concrete layer 158. According to other exemplary embodiments, the floor 156 may be a steel structure including a waterproof layer to prevent the passage of the working fluid into the surrounding rock. In another embodiment, the floor 156 may incorporate gravel or other filler material.

Referring still to FIGS. 5-6, the piston 102 is constructed within the excavated shaft 104. The piston 102 is typically constructed of reinforced concrete, steel, rock, or some similarly dense, relatively low cost material. The piston 102 is smaller in diameter than the shaft 104, with the annular space 105 between the piston 102 and liner 154 being large enough to allow access for construction and maintenance activities. If the operating fluid is liquid, such as water, vertical movement of the piston 102 results in pressure cycles on the wall of the piston 102. The piston 102 is constructed in such a way that the deterioration of the piston 102 due to these pressure cycles is minimized.

A piston base 160 is provided at the bottom of the piston 102. According to an exemplary embodiment, the base 160 is formed of reinforced concrete and/or steel. For example, the base 160 may include a reinforced concrete layer 162 and a steel plate 164 disposed below the concrete layer 162. The bottom surface of the steel plate 164 may include passages 163 to allow the influx of working fluid during operation of the energy storage system 100. The passages 163, for example, may be formed by a plurality of grooves or channels formed in the bottom surface of the steel plate 164. The passages 163 allow the working fluid to escape from between the base 160 and the floor 156 when the piston lowers to the floor 156 and allows the working fluid to enter the space between the base 160 and the floor 156 when the piston 102 is raised from the floor 156. In other embodiments, the steel plate 159 may include passages instead of or in addition to the passages 163 in the steel plate 164.

The side wall of the piston 102 may be formed on the base 160 with a movable slipform provided on the floor 156 of the shaft 104. The side wall of the piston 102 includes an outer layer 166. According to an exemplary embodiment, the outer layer 166 is formed by sheets of a metal or alloy e.g., steel, stainless steel) or another corrosion-resistant material. The sheets are positioned along the inside of the outer portion of the slipform and coupled together, such as with a welding operation, to form a unitary body that is resistant to the passage of the working fluid. The outer layer 166 is configured to provide a barrier to impede corrosion of the piston 102 as it operates submerged in the working fluid for an extended period. The outer layer 166 may include inwardly extending anchoring members, shown as studs 168 welded to the inner surface 167 of the outer layer 166, to facilitate the bonding of the outer layer 166 with an inner layer 170.

The inner layer 170 is formed inside the outer layer 166, surrounding the studs 168 and coupled to the outer layer 166. According to an exemplary embodiment, the inner layer 170 is formed from a concrete material. The inner layer 170 may include reinforcing members such as rebar that is installed adjacent to the outer layer 166.

Bracing forms such as sliding steel shutters are positioned inside the outer layer 166 and spaced apart from the outer layer 166 at a desired thickness of the inner layer 170 to provide the inside surface of the slipform. The space between the shutters and the outer layer 166 is filled with concrete to a desired depth to form the beginning of the inner layer 170. When the concrete is sufficiently hardened, the slipform is raised a distance and the next increment of the outer layer 166 (e.g., additional steel sheets) are coupled to the existing structure. The space between the shutters and the outer layer 166 is again filled with concrete to continue forming the inner layer 170. This process continues until the outer layer 166 and the inner layer 170 reach a desired height.

The piston 102 constructed in a moving slipform of nearly constant circumference, as described above, is configured to have a nearly constant outer circumference. A small amount of variation that may be caused by thermal expansion of the slipform, may be minimized by minimizing the temperature variation during the slipforming construction process. The inner layer 170 and the outer layer 166 are formed such that the walls of the piston 102 are substantially vertical to facilitate the operation of the seal assembly 130 by minimizing amount with which the seal assembly 130 must distort to maintain contact with the piston 102 as the piston 102 moves vertically within the shaft 104. According to an exemplary embodiment, the inner layer 170 and the outer layer 166 are formed such that the side wall of the piston 102 has a verticality of within ±100 mm. According to a preferred embodiment, the inner layer 170 and the outer layer 166 are formed such that the side wall of the piston 102 has a verticality of within ±50 mm. According to a particularly preferred embodiment, the inner layer 170 and the outer layer 166 are formed such that the side wall of the piston 102 has a verticality of within ±25 mm.

The outer layer 166 is configured to provide a hard, smooth, waterproof outer surface. By forming the outer layer 166 of sheet steel, it is possible to achieve low roughness, which minimizes leakage of the seal assembly 130 and maximizes the life of the seal assembly 130. According to an exemplary embodiment, the outer layer 166 is formed from a material having an average roughness Ra of less than 0.5 µm. According to a preferred embodiment, the outer layer 166 is formed from a material having an average roughness Ra of less than 0.1 µm. In other embodiments, the piston 102 may not include the outer layer 166. Instead, the piston 102 may be formed with the inner layer 170 being hardened (e.g., chemically hardened) and polished to create a hard, smooth outer surface. In other embodiments, the outer layer 166 may be another material (e.g., a polymer material, ceramic, material, composite material, etc.) that is sprayed, adhered, or otherwise coupled to the inner layer 170 such that it provides a relatively hard, smooth, waterproof outer surface. Such a relatively hard, smooth, waterproof outer surface provides a suitable sliding surface to facilitate the operation of the seal assembly 130 if the seal assembly 130 is a stationary member coupled to the walls of the shaft 104.

The base 160, the outer layer 166 and the inner layer 170 together form a hollow shell defining a cavity 172. The cavity 172 is incrementally filled with dense, inexpensive filler material 174 such as rock (e.g., the rock fragments removed when excavating the shaft 104), cement, etc. In some embodiments, the filler material 174 may include material having a greater density than rock fragments, such as iron ore, to increase the density of the piston 102 and increase the energy storage capacity of the energy storage system 100.

A piston top 176 is coupled to the end of the piston opposite of the base 160 after the cavity 172 has been filled with the filler material 174. The top 176 provides a waterproof sealing layer. The top 176 may include a waterproof sheet covered by concrete. In some embodiments, the top 176 may include an outer layer formed by a steel sheet (e.g., a steel sheet similar to the outer layer 166). In other embodiments, the top may include an outer layer formed by another material (e.g., a polymer material, ceramic, material, composite material, etc.) that is sprayed, adhered, or otherwise coupled to the top of the piston 102 such that it provides a relatively hard, smooth, waterproof outer surface.

The piston 102 is constructed such that the piston 102 is evenly balanced to minimize lateral forces that cause a tilt of the piston 102 in the shaft 104 from a vertical orientation. Measurement devices such as pressure sensors or strain gages may be utilized during the construction process to minimize the unbalanced filling of the cavity 172 with the filler material. For example, measurement devices may be installed in various locations (e.g., underneath the floor 156, on top of the floor 156, on the bottom of the piston base 160, on top of the piston base 160, etc.). The measurement devices may be connected to a network to provide measurement information to an analysis device (e.g., a computer) at a central location. By comparing data from the measurement devices (e.g., pressure readings, strain readings, etc.) with the analysis device, the mass distribution of the piston 102 can be determined and adjustments can be made to balance the mass of the piston 102, such as by selectively increasing or decreasing the addition of denser material (e.g., iron ore, iron) and less dense material (e.g., rock fragments, etc.) or openings (e.g., shafts or cavities formed in the piston 102). For example, if the center of mass of the piston 102 is offset toward one side, a hole can be drilled in the top of the piston 102 on the opposite side and filled with material that is more dense than the removed rock, such as iron ore or iron. Alternatively, a hole can be drilled in the top of the piston 102 on the same side as the mass offset, and refilled with material that is less dense than the removed rock or left unfilled.

Alternate Construction

Figure 7:
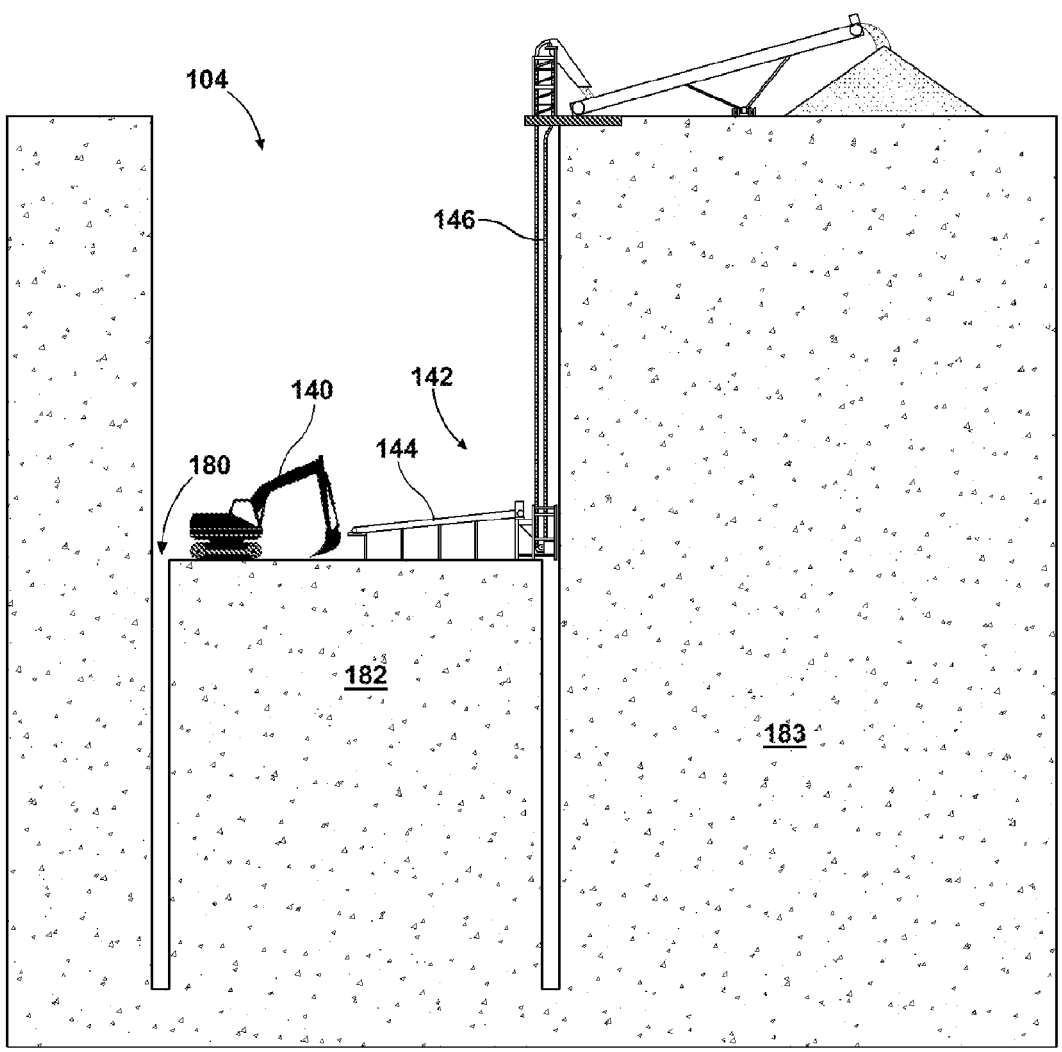
FIG. 7 is a cross-section view of the excavation of a shaft and an excavated piston for the gravity-hydraulic energy storage system of FIG. 3, according to another exemplary embodiment.
Figure 8:
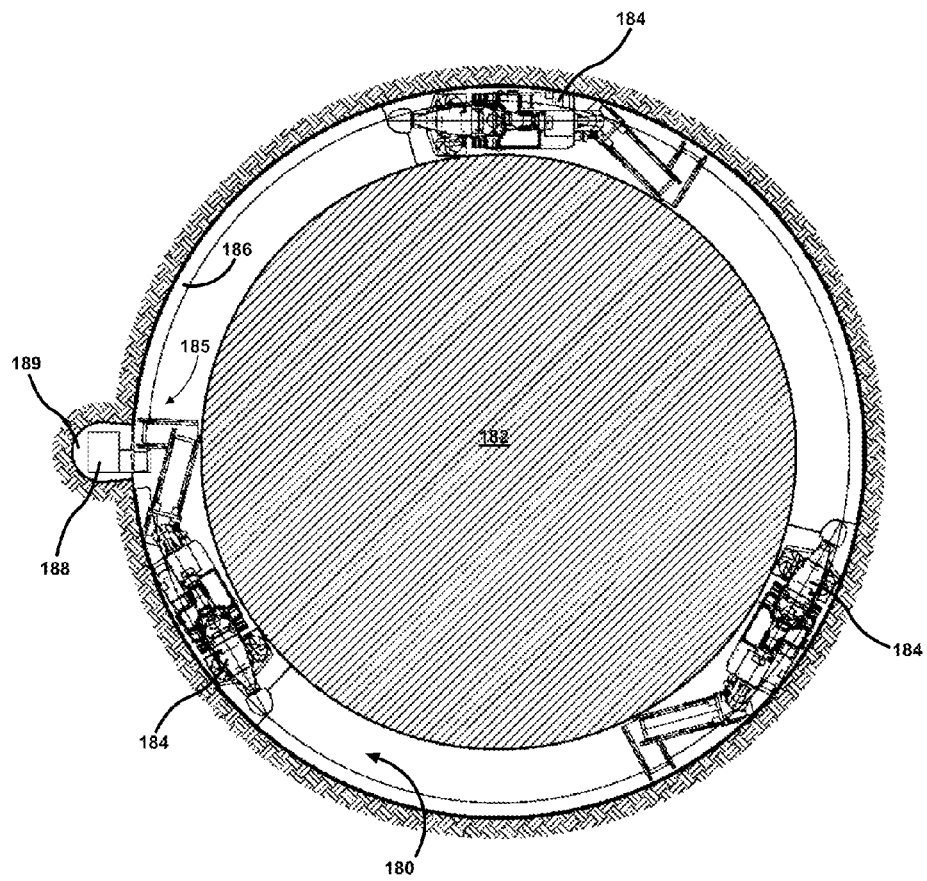
FIG. 8 is top view of a process for excavating the excavated piston of FIG. 7, according to an exemplary embodiment.
Figure 9:
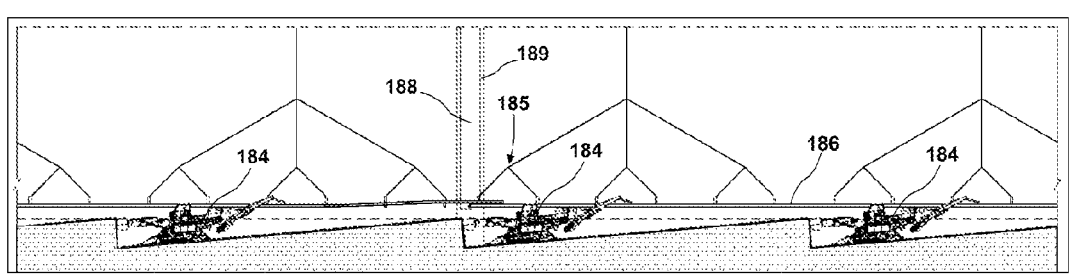
FIG. 9 is a panoramic cross-section view of the process for excavating the excavated piston of FIG. 8.

Referring to FIGS. 7-9, the piston 102 is shown being constructed according to another exemplary embodiment with an excavation process. The excavation process, as described below, produces a piston 102 and shaft 104 structure similar to the fabrication process described above, but with the piston 102 having a core that is formed from the native rock instead of a core formed from fill material, such as rock fragments and concrete.

The shaft 104 is formed by excavating an opening in the ground as described above. However, the excavation process is continued for only a portion of the desired depth of the shaft 104 and then halted. For example, the shaft 104 may be excavated to a depth approximately equal to the difference between the desired depth of the shaft 104 and the desired height of the piston 102. According to one exemplary embodiment, the piston 102 has a height approximately ½ the depth of the shaft 104 and the shaft 104 is excavated to a depth of approximately ½ of the desired final depth with the process described above.

A second process in then used to cut an annulus 180 surrounding a central rock column 182 to form the piston 102. The annulus 180 is formed with one or more excavation machines 184, shown schematically in FIGS. 8-9. The excavation machines 184 may be, for example, roadheader machines (e.g., continuous mining machines) having a rotary cutting head on an articulated boom. In other embodiments, the annulus 180 may be formed with another device, such as trenching machines or drills and explosives. The annulus 180 is formed to create a gap between the piston and the shaft wall that is large enough to allow access for inspection and maintenance.

As shown in FIGS. 8-9, the annulus 180 is formed using three excavation machines 184 positioned around the outer circumference of the shaft 104. Each of the excavation machines 184 cuts a trench along a continuous circular path, gradually making the trench deeper. The removed material is fed to the rear of the excavation machine 184. The material is loaded onto a conveyor 185, which transfers the material out of the shaft 104. The conveyer 185 may include both horizontal conveyers 186 and vertical conveyers 188. In an exemplary embodiment, the conveyer 185 includes a circular horizontal conveyor 186 suspended around the periphery of the annulus 180 and a vertical conveyor 188 provided in a shaft 189 at the edge of the annulus 180. The shaft 189 may be excavated at the same time as the shaft 104 and the annulus 180. The removed material is deposited onto the horizontal conveyer 186 by each of the excavation machines 184 and transferred to the vertical conveyer 188 to be removed from the annulus 180 and the shaft 104. The excavation process forming the annulus 180 is continued until the annulus 180 reaches a depth that is sufficient for the rock column 182 to have a desired height for the piston 102.

As previously described, as the annulus 180 is being formed, the shaft wall 152 can be incrementally stabilized with rock bolts 150 and the liner 154. The liner 154 may be formed with a slip-forming process or may be formed with a shotcrete spraying process. Likewise, the rock column 182 can be incrementally stabilized.

Figure 10:
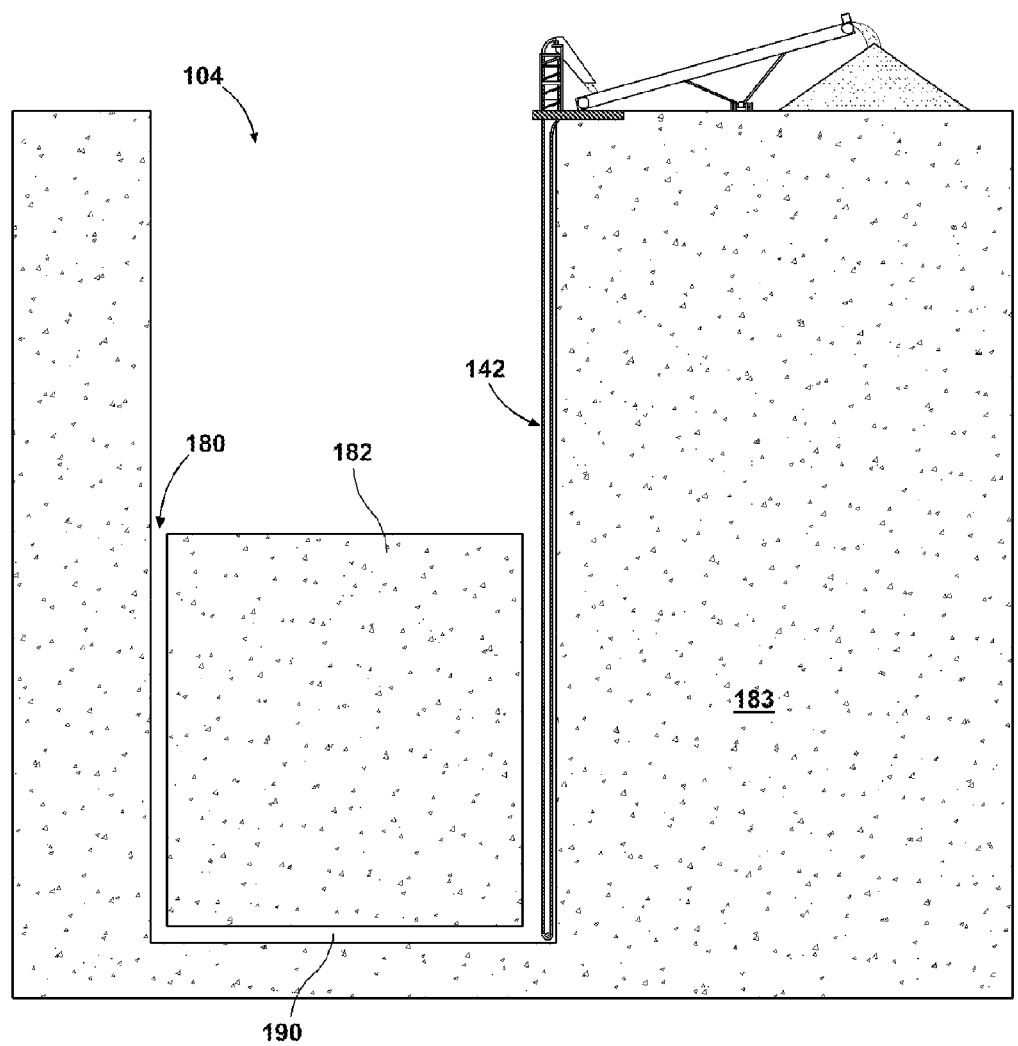
FIG. 10 is a cross-section view of a further process for excavating the excavated piston of FIG. 7.
Figure 11A:
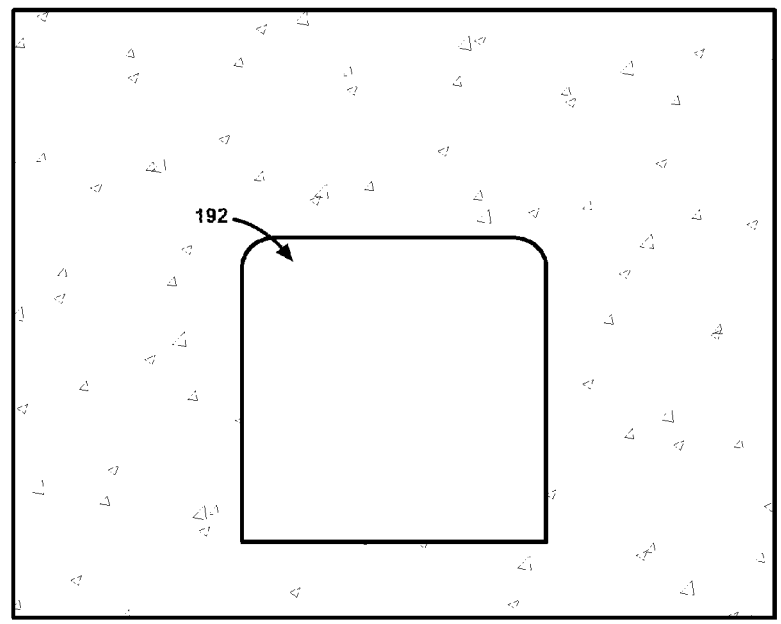
FIG. 11A is a cross-section view of a tunnel excavated underneath the piston of FIG. 7.
Figure 11B:
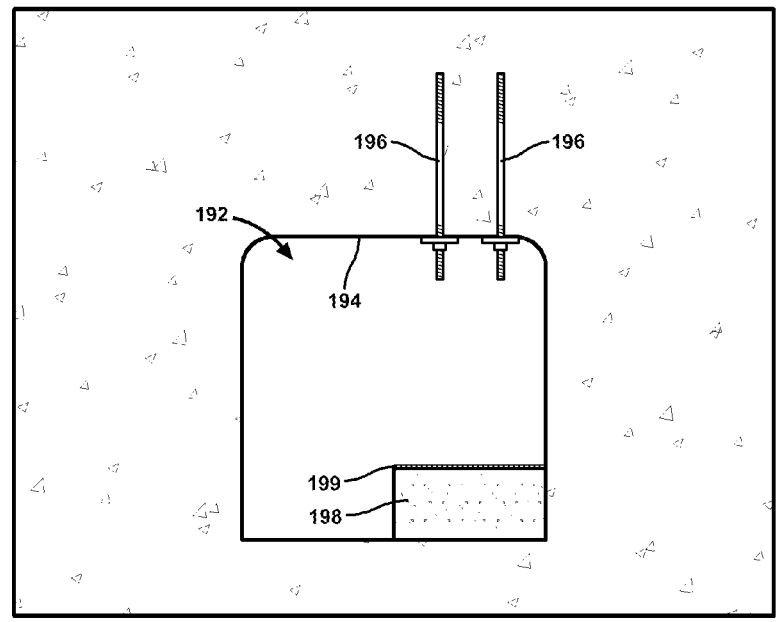
FIG. 11B is a cross-section view of the tunnel of FIG. 11A, illustrating a portion of the shaft floor formed in the tunnel.
Figure 11C:
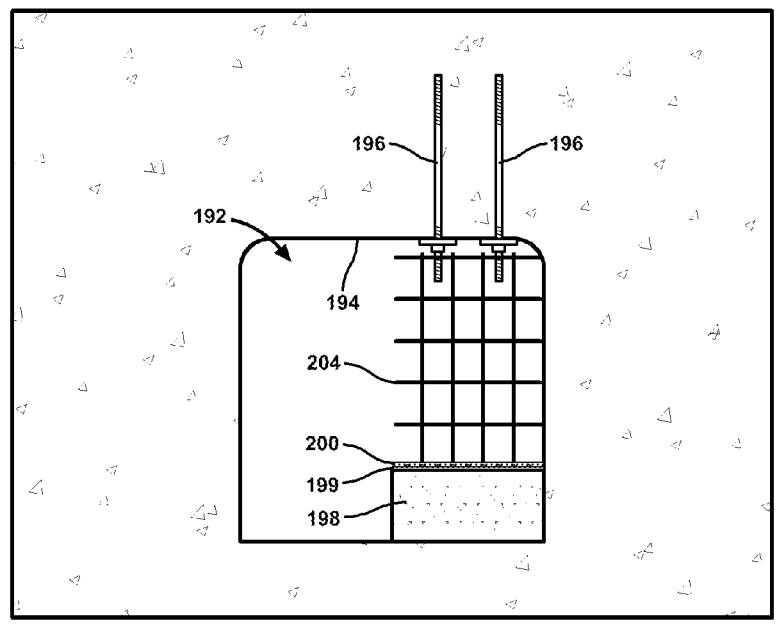
FIG. 11C is a cross-section view of the tunnel of FIG. 11A, illustrating a portion of the piston base formed in the tunnel.
Figure 11D:
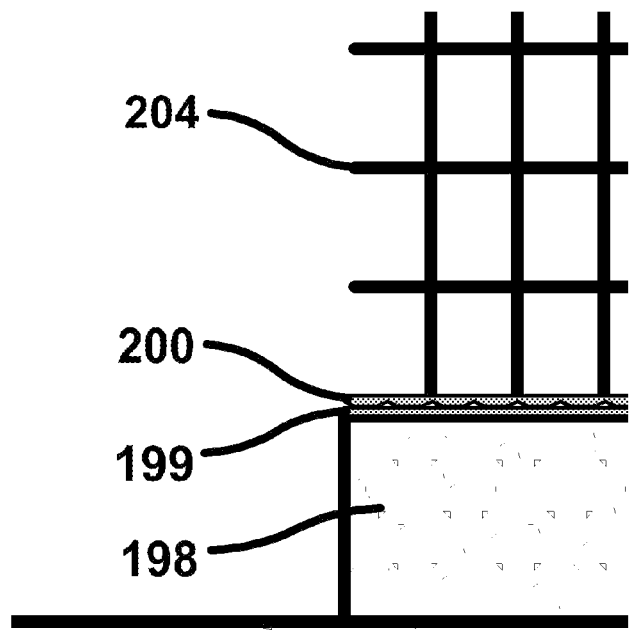
FIG. 11D is a detail cross-section view of portion of the piston base and the shaft floor of FIG. 11C.
Figure 11E:
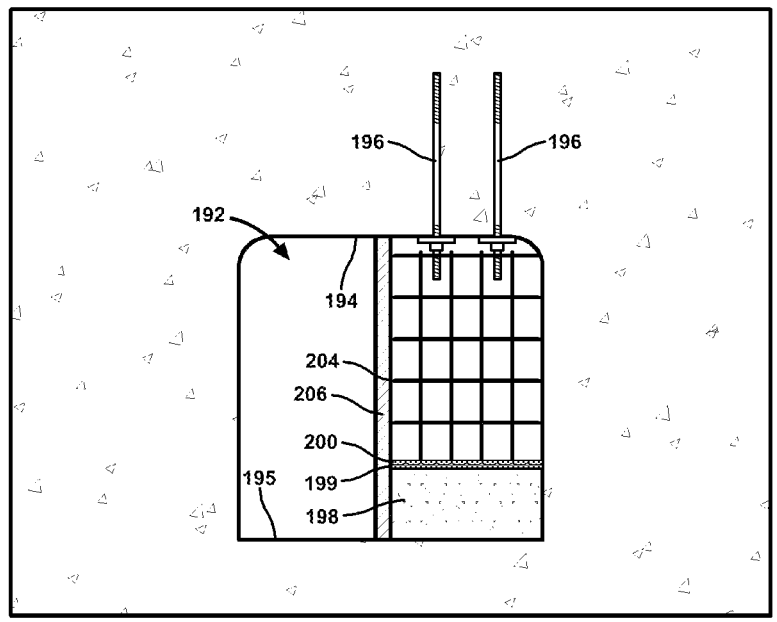
FIG. 11E is a cross-section view of the tunnel of FIG. 11A, illustrating a retaining form installed in the tunnel.
Figure 11F:
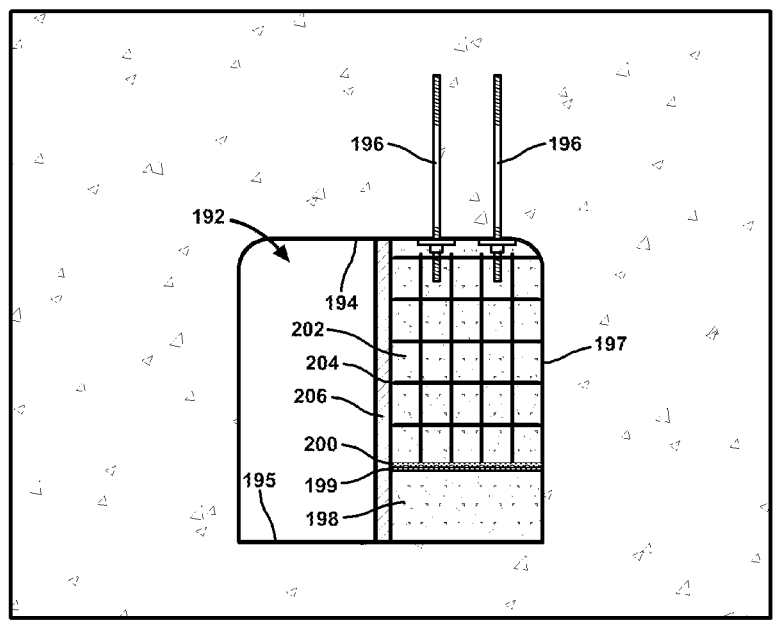
FIG. 11F is a cross-section view of the tunnel of FIG. 11A, illustrating a portion of the piston base being formed in the tunnel.
Figure 11G:
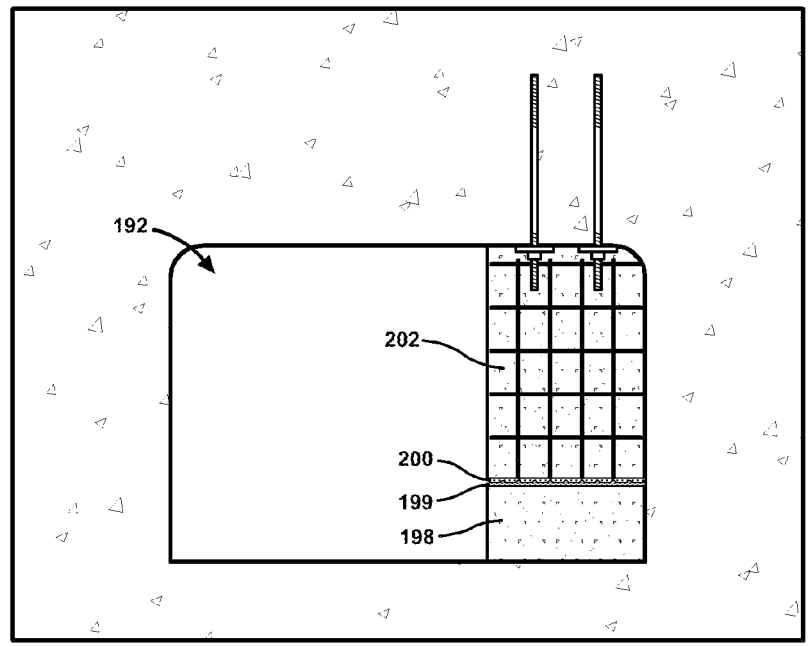
FIG. 11G is a cross-section view of the tunnel of FIG. 11A widened after forming a portion of the shaft floor and the piston base.

Referring now to FIGS. 10-11G, the rock column 182 is separated from the surrounding rock 183 to form the piston 102 by forming a cavity 190 through the base of the rock column 182, the cavity 190 extending outward to the annulus 180. Referring to FIG. 11A, the cavity 190 is formed by first forming a horizontal tunnel 192 across the width of the rock column 182 and extending from the annulus 180 on either side. The tunnel 192 can be excavated using roadheaders, drill and blast, or any other conventional mining technique, with the removed material being removed from the tunnel 192 by the conveyer system 142, as described above. According to an exemplary embodiment, the tunnel 192 has a width of approximately 3-4 meters, or less than approximately 15% of the total diameter of the rock column 182. The rock column 182 therefore remains substantially supported by native rock. The tunnel 192 has a height that allows for the fabrication of the floor 156 of the shaft 104 and the base 160 of the piston 102.

Referring to FIG. 11B, a ceiling 194 of the tunnel 192 can be stabilized with stabilizing devices, such as rock bolts 196 that are driven into the ceiling 194. Along one side of the tunnel 192, a concrete strip 198 forming a portion of the concrete layer 162 is installed. The concrete strip 198 has a width that is less than the width of the tunnel 192, providing sufficient clearance for workers to operate within the tunnel 192. The concrete strip 198 may be reinforced, such as with rebar or other strengthening members or additives (e.g., particles, fibers, etc.) provided within the concrete strip 198. A steel plate 199 forming a portion of the steel plate 159 is disposed on the top surface of the concrete strip 198. The steel plate 199 may be coupled to the concrete strip 198, such as with studs, bolts, adhesives, etc. Together, the concrete strip 198 and the steel plate 199 extend along the length of the tunnel 192 and form a portion of the floor 156 of the shaft 104. The concrete 198 and the steel plate 199 may be installed in sections, with each section having a length that is a portion of the total length of the tunnel 192.

Referring to FIGS. 11C-D, another steel plate 200 is disposed on top of the steel plate 199, forming a portion of the steel plate 164. The bottom surface of the steel plate 200 may include passages 163 to allow the influx of working fluid during operation of the energy storage system 100. Rebar 204 is installed between the steel plate 200 and the ceiling 194 of the tunnel 192.

Referring to FIG. 11E, a retaining form 206 is installed beside the rebar 204 such that it abuts the concrete 198 and the steel plate 199 and extended between the ceiling 194 and a floor 195 of the tunnel 192. The retaining form 206 may extend along the entire length of the tunnel 192 or may extend along only a portion of the tunnel 192, in which case, the retaining form 206 may include an end portion extending across the tunnel 192 between the steel plate 200 and the ceiling 194.

Referring to FIG. 11F, concrete is poured to completely fill the space between the steel plate 200, the ceiling 194, the retaining form 206, and a wall 197 of the tunnel 192. Together the concrete strip 202 and the steel plate 200 extend along the length of the tunnel 192 and form a portion of the base 160 of the piston 102. The concrete strip 202 and the steel plate 200 may be installed in sections, with each section having a length that is a portion of the total length of the tunnel 192. If formed in sections, the rebar 204 may be configured to extend beyond the retaining form 206 such that the rebar 204 extends through multiple sections of the concrete strip 202.

During the formation of the concrete strips 198 and 202 and the steel plates 199 and 200, measurement devices such as pressure sensors or strain gages may be installed in various locations (e.g., underneath the steel plate 199, on top of the steel plate 199, on the bottom of the steel plate 200, on top of the steel plate 200, etc.).

Figure 11H:
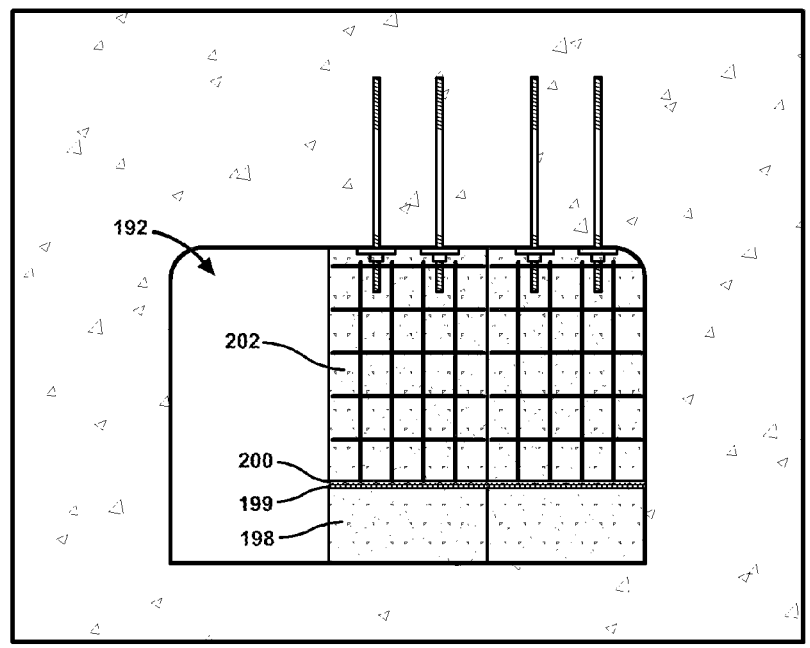
FIG. 11H is a cross-section view of the tunnel of FIG. 11A illustrating a second portion of the shaft floor and the piston base.

Referring to FIGS. 11G-11H, after the concrete strips 198 and 202 and the steel plates 199 and 200 are installed in the tunnel 192, the tunnel 192 is widened. The above procedure is repeated to install another set of concrete strips 198 and 202 and steel plates 199 and 200, abutting the already installed structure. The adjacent steel plates 199 and/or the adjacent steel plates 200 may be coupled together, such as with a welding operation or with mechanical fasteners. The procedure is repeated on both sides of the original tunnel 192 until the base of the rock column 182 has been completely separated from the surrounding rock to form the core of the piston 102. The concrete strips 198 and 202 and the steel plates 199 and 200 form a structure that extends from the floor 195 to the ceiling 194 of the tunnel 192. Therefore, the rock column 182 is continually supported from below except for the relatively narrow width of the open tunnel 192 during the procedure, minimizing the probability of a cave-in in the tunnel 192 or a formation of cracks in the piston 102.

Figure 12:
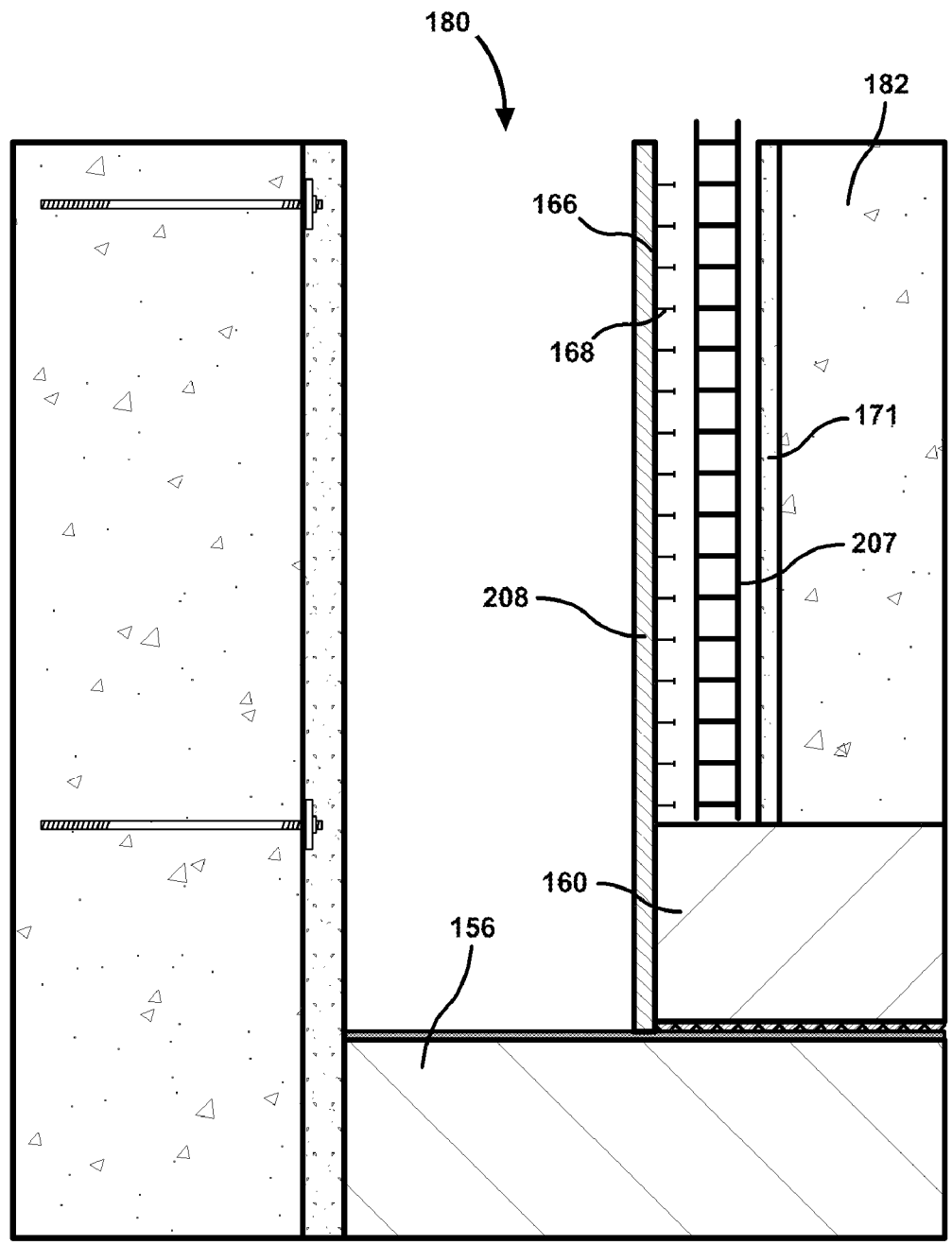
FIG. 12 is a cross-section view of the base of the piston and shaft of FIG. 7

Referring now to FIG. 12, after the rock column 182 is separated from the surrounding rock and stabilized, and the shaft floor 156, and the piston base 160 are constructed, the outer layer 166 is formed on the cylindrical side surface of the rock column 182 in the annulus 180. The stabilizing layer 171 may be, for example, shotcrete sprayed onto the rock column 182. A reinforcing member, shown as a section of rebar 207 is installed in the annulus 180 around the base of the rock column 182. The outer layer 166 may be formed in sections having a height less than the total height of the piston 102 and a width that is less than the total circumference of the piston 102. According to an exemplary embodiment, the outer layer 166 is formed in sections having a height of approximately 2-4 meters. Steel sheets with backing studs 168 forming the outer layer 166 are positioned outside rebar 207, separated from the rock column 182 by the desired thickness of the inner layer 170. A bracing form 208 is assembled around the outer layer 166 to position the outer layer 166 such that the piston 102 has a desired circumference and contour. The space between the stabilizing layer 171 and the outer layer 166 is then filled with concrete, surrounding the rebar 204 to form a section of the inner layer 170. The procedure is then repeated to create the next section of the inner layer 170 and the outer layer 166 adjacent to the first section until the inner layer 170 and the outer layer 166 are formed to a desired height (e.g., the top of the rock column 182). As described above, in other embodiments, the piston 102 may not include the outer layer 166 and the outer surface of the inner layer 170 may be hardening and polished to provide a sufficiently hard, smooth outer surface of the piston 102 or the inner layer 170 may be coated with another material. By using the same bracing form for every segment of the inner layer 170 and the outer layer 166, the piston 102 is formed to have a constant circumference and profile along its height.

The piston top 176 is coupled to the end of the rock column 182 opposite of the base 160 after the inner layer 170 and the outer layer 166 have been formed to the desired height. The top 176 provides a waterproof sealing layer.

Seal Assembly

Referring now to FIGS. 13-17, the seal assembly 130 for the energy storage system 100 is shown according to an exemplary embodiment. The seal assembly 130 is configured to prevent excessive fluid leakage past the piston 102 inside the shaft 104 between the upper chamber 106 and the lower chamber 108. The seal assembly 130 is disposed in the gap between the piston 102 and the liner 154 coupled to the wall 152 of the shaft 104. According to an exemplary embodiment, the seal assembly 130 is coupled to the liner 154 with a seal assembly mount 210 that is fixed to the liner 154. The seal assembly 130 includes multiple seals 212 that slidably engage the outer surface 214 of the piston 102. The outer surface 214 is configured to be a smooth, hard surface (e.g., the outer layer 166 or the hardened outer surface of the inner layer 170) to reduce wear to the seals 212 and reduce the leakage of fluid past the seal assembly 130.

According to an exemplary embodiment, the energy storage system 100 may be configured to store energy equivalent to tens to thousands of megawatt-hours of electricity or more and to accommodate power levels up to hundreds of megawatts or more. The energy storage system 100 may include a large piston 102 that produces high fluid pressure. For example, if the energy storage system 100 includes a piston 102 having a height of 250 meters and a density of 2500 kg per cubic meter, and the working fluid is water, the working pressure is 3.7 MPa (~540 psi) (i.e., the pressure immediately below the seal assembly 130 is 3.7 MPa higher than the water pressure immediately above the seal assembly 130). In other embodiments, the working pressure may range from less than 1 MPa (145 psi) to more than 10 MPa (1450 psi), depending on the size and density of the piston 102.

The seal assembly mount 210 is provided on the liner 154 at a height approximately equal to the top of the piston 102 when the piston 102 is at its lowest position (i.e., resting on the floor 156 of the shaft 104. The seal assembly mount 210 is constructed such that it is able to withstand a large pressure differential between high pressure working fluid below the mount 210 and low pressure fluid above the mount 210. The seal assembly mount 210 may be constructed, for example, as a steel structure or as a reinforced concrete structure with a steel cover or shell. In one embodiment, the seal assembly mount 210 is a ring-shaped member having a generally trapezoidal cross-section, an outer surface 216 coupled to the wall of the shaft 104, a frustoconical upper surface 217, an inner surface 218, and a frustoconical lower surface 219. In other embodiments, the seal assembly mount 210 may be otherwise shaped. For example, the upper surface 217 and/or the lower surface 219 may be horizontal surfaces generally parallel to the shaft floor 156 or may be curved surfaces. According to an exemplary embodiment, the seal assembly mount 210 is formed such that it is permanently anchored into the wall 152 and/or the liner 154, such as with rock bolts. In other embodiments, the seal assembly mount 210 may be a removable structure.

The seal assembly mount 210 extends inward such that the inner surface 218 is separated from the outer surface 214 of the piston 102 by a relatively narrow gap 215. According to an exemplary embodiment, the gap 215 has a consistent width of approximately 20 centimeters (8 inches) around the entire circumference of the piston 102.

Figure 13:
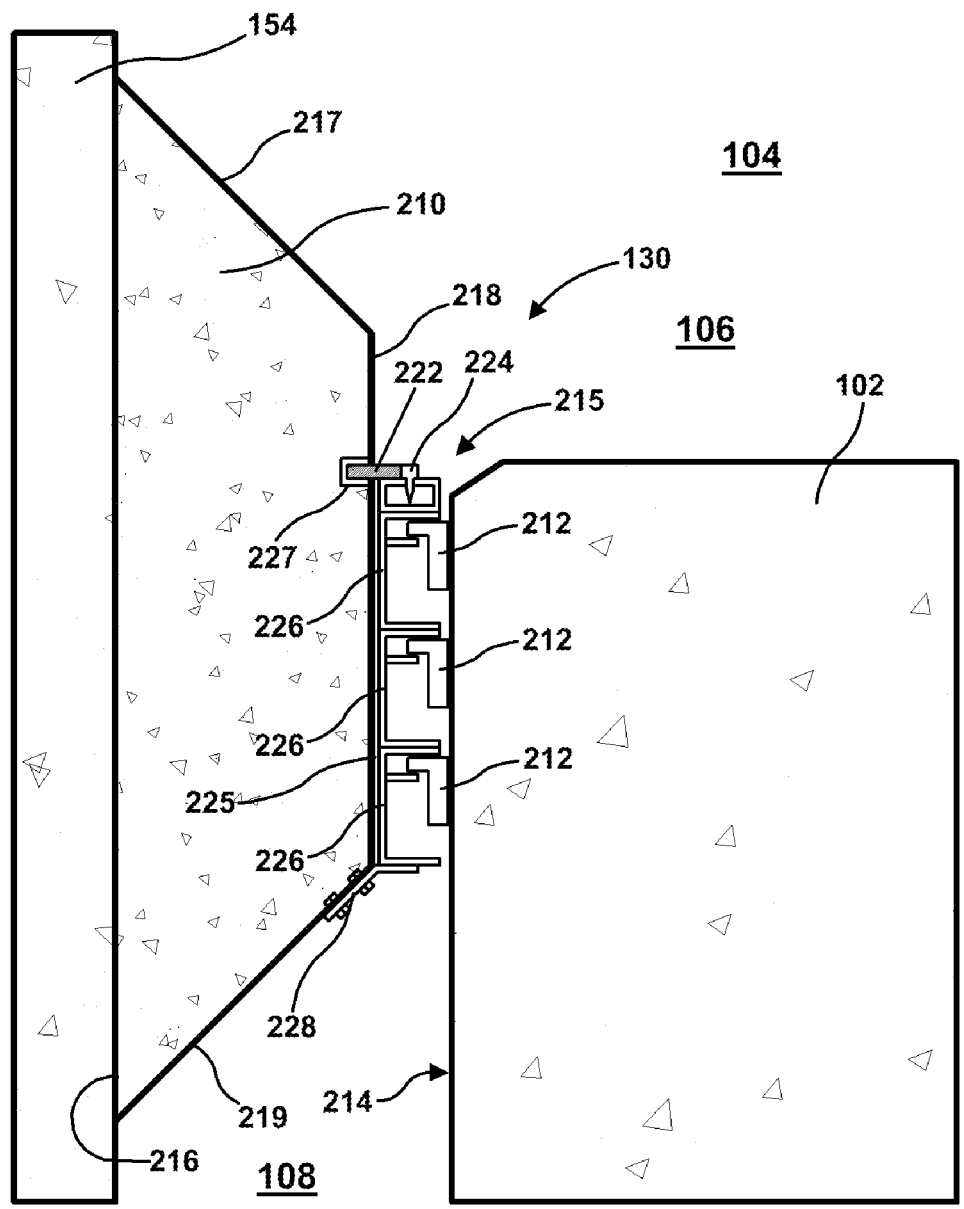
FIG. 13 is a cross-section view of a seal assembly mount and seal assembly for use in the energy storage system of FIG. 3.

Referring to FIG. 13, the seal assembly 130 is coupled to the inner surface 218 of the seal assembly mount 210 in the gap 215. The seal assembly 130 includes a mounting ring 220 to which the seals 212 are mounted. According to an exemplary embodiment, the mounting ring 220 is constructed with seal stages 226 coupled to a backing plate 225. According to an exemplary embodiment, the seal assembly 130 is configured to include three seal stages 226 arranged vertically. In other embodiments, the seal assembly 130 may include less than three seal stages 226 or may include more than three seal stages 226.

The seal assembly 130 is supported by an inwardly extending bracket 228 that is coupled to the lower surface 219 of the seal assembly mount 210. The seal assembly 130 is locked into place relative to the seal assembly mount 210 by a locking plate 222 and locking pins 224. The locking plate 222 engages a slot 227 in the seal assembly mount 210, preventing upward movement of the seal assembly 130 relative to the seal assembly mount 210 and trapping the seal assembly 130 against the bracket 228. The locking plate 222 is divided into multiple arcuate sections.

Figure 14:
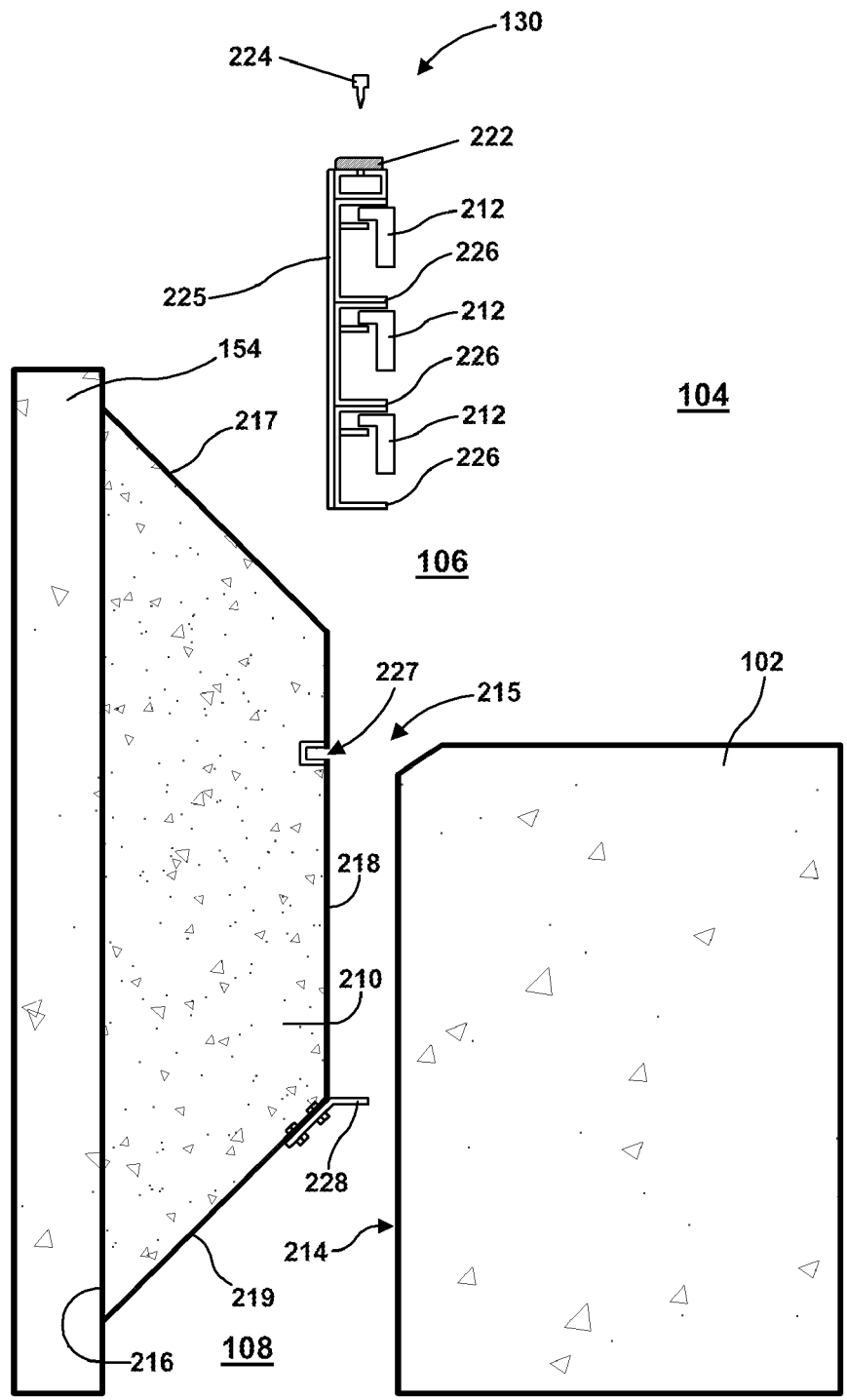
FIG. 14 is a cross-section view of the seal assembly mount and seal assembly of FIG. 13, with the seal assembly removed for maintenance.
Figures 15, 16:
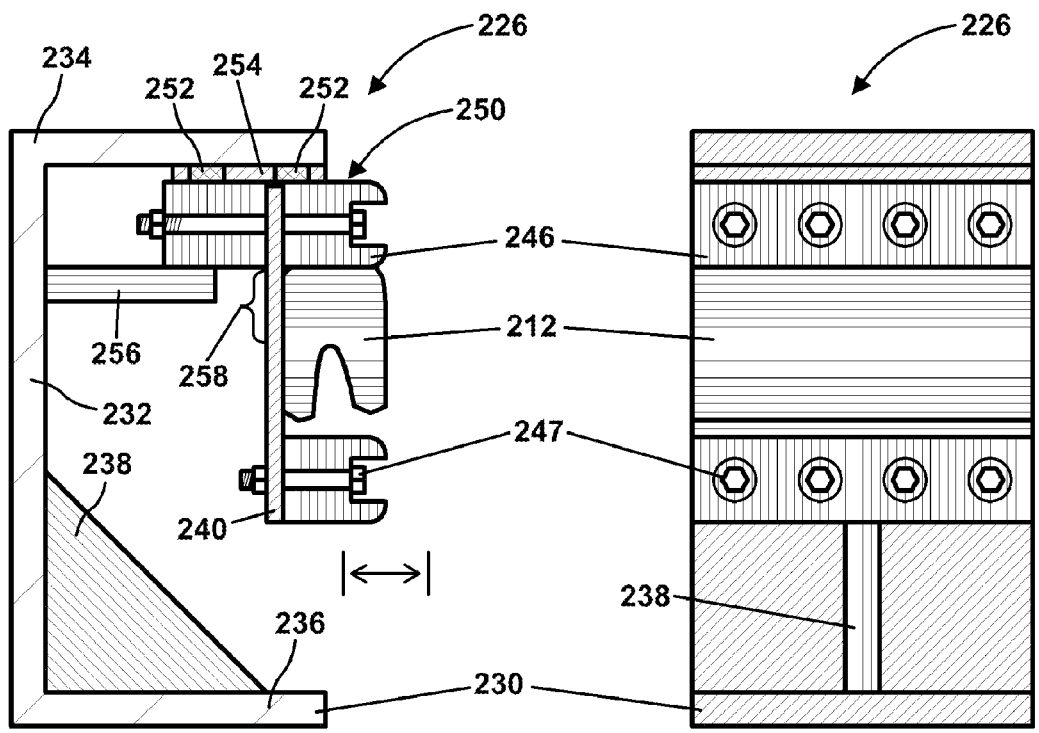
FIG. 15 is a cross-section view of a seal stage for the seal assembly of FIG. 13, according to an exemplary embodiment.
FIG. 16 is a front elevation view of a portion of the seal stage of FIG. 15.
Figures 17, 18:
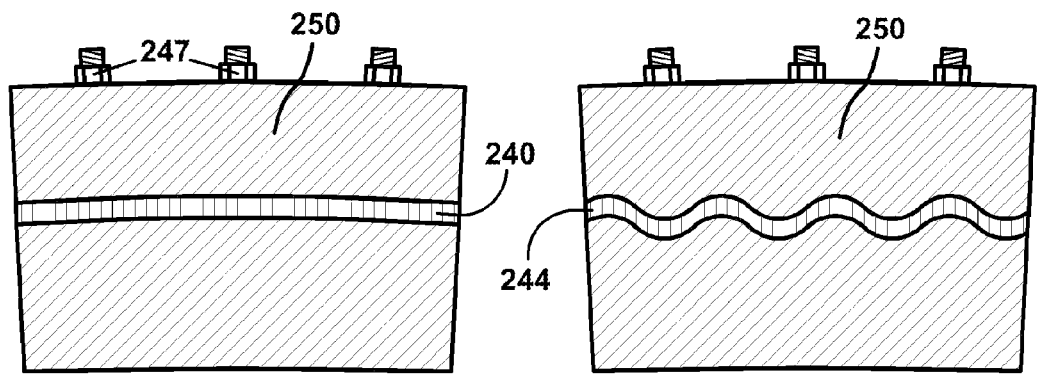
FIG. 17 is a top elevation view of a portion of a seal carrier for the seal stage of FIG. 15.
FIG. 18 is a top elevation view of portion of the seal carrier of FIG. 15 according to another exemplary embodiment.

Referring to FIG. 14, the seal assembly 130 can be removed from the seal assembly mount 210 by removing the locking pins 224. With the locking pins 224 removed, the sections of the locking plate 222 can be slid inward, out of the slot 227. The seal assembly 130 can then be moved upward (e.g., hoisted by an overhead crane mechanism). In this way, if the working fluid is a liquid, the seal assembly 130 can be accessed and the seals 212 inspected and replaced without pumping the working fluid out of the shaft 104, and greatly decreasing maintenance difficulty and expense of the energy storage system 100.

Referring to FIGS. 15-18, a single seal stage 226 is shown to be assembled inside a steel channel 230 designed to withstand the high pressure of the working fluid. The steel channel 230 has a C-shaped cross-section formed by a vertical web 232, an upper annular flange 234, and a lower annular flange 236. Reinforcing members 238 (e.g., fins, gusset plates, braces, etc.) may be provided to increase the strength and stiffness of the channel 230.

The seal 212 is coupled to a seal carrier 240. Referring to the top view in FIG. 17, the seal carrier 240 may be formed as a continuous ring formed of a strong, resilient material such as steel. Referring to the top view of an alternative embodiment in FIG. 18, seal carrier 244 may be a continuous ring with corrugations to increase its ability to expand and contract to accommodate variations in the circumference of piston 120. The seal carrier 240 includes space to receive the seal 212 and contact pads 246. The seal 212 is formed of a resilient material, such as a synthetic polymer (e.g., polyurethane, polybutadiene, etc.), that is capable of being compressed against the piston 102 and conforming to the outer surface 214 to create a seal against the passage of working fluid between the seal assembly 130 and the piston 102. According to an exemplary embodiment, the seal 212 may be formed (e.g., machined, molded, extruded, etc.) in segments that can be field welded or bonded into a continuous ring tens or even hundreds of meters in diameter. The contact pads 246 are formed of a strong, low friction material such as ultra-high molecular weight polyethylene or Vesconite that resist compression. The contact pads 246 are disposed above and/or below the seal 212, are bolted or otherwise attached to the seal carrier 240, and are configured to prevent contact between the seal carrier 240 the piston 102. The seal 212 and the contact pads 246 are configured to have a low coefficient of friction when sliding on a steel surface, such as the outer layer 166 of the piston 102 or when sliding on a smooth concrete surface, such as the inner layer 170 of the piston 102. If the seal assembly 130 encounters a raised discontinuity (e.g., ridge, bump, swell, etc.) in the surface of the piston 102, the relatively hard contact pads 246 displace the seal carrier 240 locally outward in the area of the discontinuity, protecting the relatively soft seal 212 from a shearing action.

A bearing surface 250 is provided along the top side of the seal carrier 240. During operation of the energy storage system 100, high pressure fluid in the lower chamber 108 applies an upward force on the bottom of the seal carrier 240 and an inward force on the outer surface of the seal carrier 240, forcing the seal carrier 240 upward against the bearing surface 250 and inward against the piston 102. The bearing surface 250 contacts bearing seals 252 and a bearing structure 254 mounted on the underside of the upper flange 234. The bearing seals 252 and the bearing structure 254 may be similar in materials and construction to the seal 212 and the steel channel 230, respectively. The bearing surface 250 allows the seal carrier 240 to slide in a radial direction relative to the upper flange 234 while preventing the passage of fluid between the channel 230 and the seal carrier 240. The bearing surface 250 allows the seal carrier 240 to follow any variations in verticality of the piston surface 214 without compromising the integrity of the seal provided by the seal assembly 130. According to an exemplary embodiment, the seal carrier 240 is configured to be able to move in a radial direction+/−25 mm.

In operation, the seal 212 expands inward in a radial direction due to the pressure of the working fluid in the lower chamber 108 below the seal assembly 130, tightly filling the gap between the seal carrier 240 and the piston 102 to prevent fluid from leaking past. The seal carrier 240 is forced towards toward the piston 102 by a pressure acting on a zone 258 along the seal carrier 240. The zone 258 extends from roughly from the center of the seal 212 to the bottom of the upper contact pad 246. Most of the pressure acting on the zone 258 is absorbed by the contact pads 246. Because the contact pads 246 and the seal 212 have a low coefficient of friction when sliding on a steel surface, the seal assembly 130 provides low friction, excellent sealing, and a long life for the seal 212.

The modulus of steel allows the seal carrier 240 to stretch or compress by a large enough percentage to follow any small variations in the circumference of the piston 102 that result from the construction of the piston as described above (e.g., the fabrication procedure or the excavation procedure). For example, for stainless steel with a yield strength of 500 megapascals and an elastic modulus of 180 gigapascals, the maximum strain is:

$$\text{Strain} = 500 \text{ MPa}/180 \text{ GPa} = 2.8 \times 10^{-3} = 0.28\%$$

For a seal carrier 240 formed from stainless steel and with a diameter of 96 feet (30 meters), the maximum strain in the circumference of the seal carrier 240 is:

$$0.0028 \times \pi \times 96 = 0.84 \text{ feet (26 centimeters)}$$

For high strength steel with a yield strength of 1200 megapascals and an elastic modulus of 210 gigapascals, the maximum strain is:

$$\text{Strain} = 1200 \text{ MPa}/210 \text{ GPa} = 0.57\%$$

For a seal carrier 240 formed from such a high strength steel and with a diameter of 30 meters, the maximum stretch in seal circumference is 54 centimeters. Using the piston construction procedures described above, 0.28% of seal carrier stretch would generally be more than adequate. But in systems where even 0.57% of stretch is insufficient, the construction of the seal carrier with corrugations 244 can increase the amount which the seal carrier 240 can expand or contract. Additional expansion or contraction in the radial direction is provided by the seal 212, which is capable of many times the circumferential expansion of the seal carrier 240, due to having a lower elastic modulus and much higher elastic limit than a steel material.

Since it is subject to the high pressure of the working fluid, the seal carrier 240 is also able to compress if the circumference of the piston 102 is smaller than the relaxed circumference of the seal carrier 240. To avoid the possibility of the seal carrier 240 buckling, the seal carrier 240 is configured to have a relaxed circumference that is at least as small as the minimum circumference of the piston 102.

Figure 19:
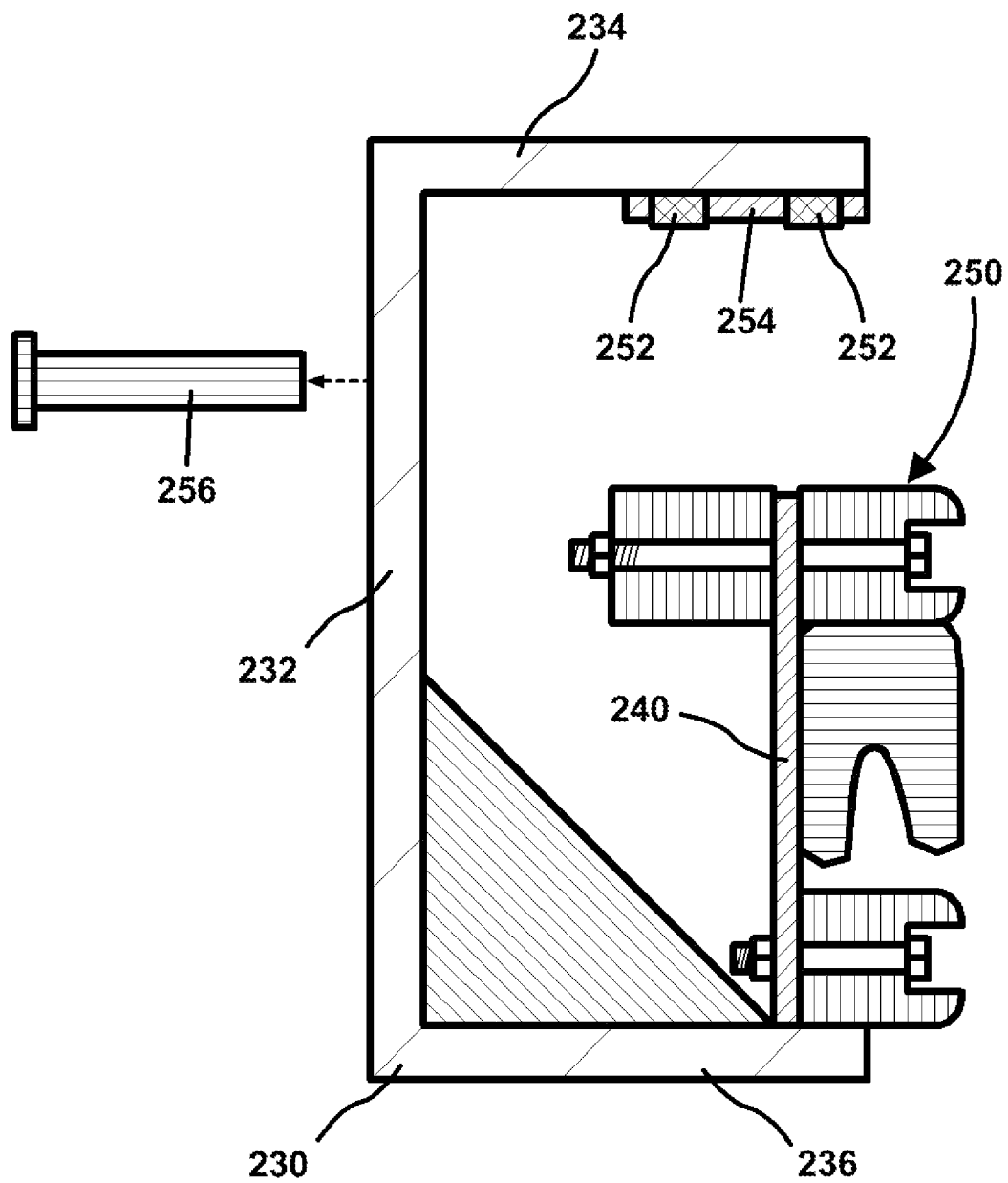
FIG. 19 is a cross-section view of the seal stage of FIG. 15, with the seal carrier moved to allow access to a bearing.

During maintenance, after the seal assembly 130 has been hoisted upward from the seal assembly mount 210 and out of the working fluid to the surface, the seal carrier 240 can be moved to improve access to the bearing seals 252. The vertical movement of the seal carrier 240 is limited by members, shown as retaining pins 256 in FIGS. 15 and 19 engaging the vertical web 232 of the channel 230. By removing the retaining pins 256, the seal carrier 240 can be lowered to the bottom of the channel 230 as shown in FIG. 19. With the seal carrier 240 lowered to the bottom of the channel 230, the bearing surface 250 and the bearing seals 252 can be accessed for inspection and repair.

In an alternative embodiment, the seal assembly mount 210 may be mounted on the piston 102, extending outward such that the outer surface 216 of the seal assembly mount 210 is separated from the liner 154 by a gap. The seal assembly 130 is coupled to the outer surface 216, extending into the gap such that the seals 212 are forced against the liner 154. In this embodiment, the liner 154 is configured to provide a smooth, hard, waterproof surface to allow the formation of an effective seal and to prevent damage from pressure swings.

The seal assembly 130 as described above reduces the probability of a catastrophic failure of the energy storage system 100 in which unobstructed flow of fluid between the piston 102 and the walls of the shaft 104 allows the piston 102 to drop in an uncontrolled manner with its speed limited only by hydrodynamic drag. The seal assembly 130 can be configured such that each of the seal stages 226 is able to handle the full operating pressure of the energy storage system 100. If one of the individual seal stages 226 fails, the seal assembly 130 will continue to operate as long as at least one of the seal stages 226 is intact. If all of the seal stages 226 fail, the robust structure of the seal assembly 130 and the relatively narrow gap 215 between the piston 102 and the seal assembly mount 210 restricts fluid flow and limits the speed of the falling piston 102.

Piston Cradle

Figure 20:
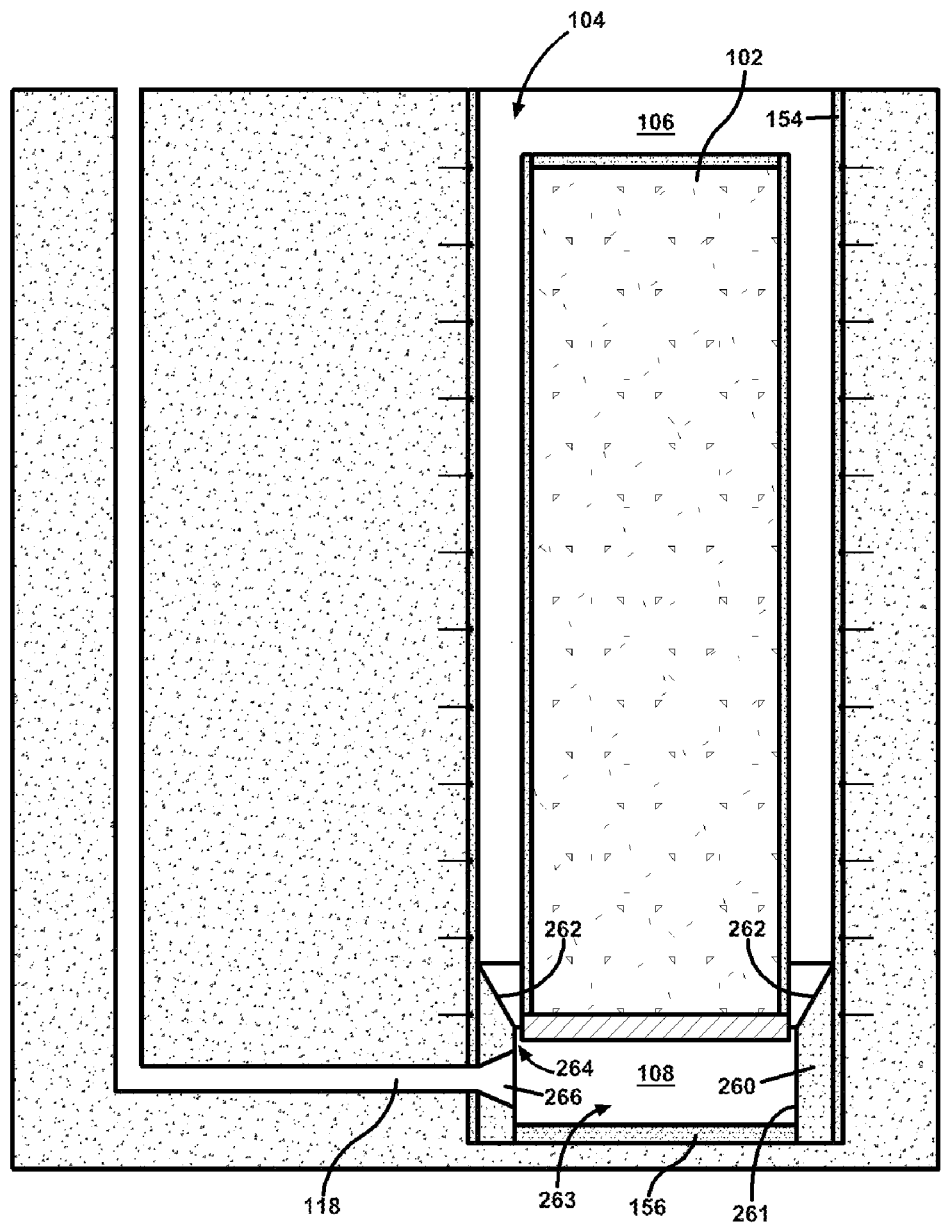
FIG. 20 is a cross-section view of the energy storage system of FIG. 3, illustrating a piston cradle, according to an exemplary embodiment.

Referring now to FIG. 20, a piston cradle 260 is shown disposed in the lower portion of the shaft 104. The piston cradle 260 gradually narrows the gap between the piston and the shaft wall to constrict the flow of fluid. As the piston 102 approaches the floor 156 of the shaft 104, the gap between the piston 102 and the walls of the shaft 104 decreases, decreasing the flow rate of the working fluid around the piston 102 from the lower chamber 108 to the upper chamber 106. The decreasing of the flow rate increases the pressure in the lower chamber 108 under the piston 102, providing a cushion to slow the descent of the piston 102. The piston cradle 260 therefore provides a mechanism to slow the decent of the piston 102 if the seal assembly 130 fails with the piston 102 elevated.

In an exemplary embodiment, the piston cradle 260 is a reinforced concrete and steel structure. The outer surface of the piston cradle 260 is a durable material, such as stainless steel, to avoid deterioration from long exposure to the working fluid or erosion from high pressure flow. The piston cradle 260 includes an inner surface 261 defining a central socket 263 that is configured to receive a lower portion of the piston 102 and has a diameter that is minimally larger than the diameter of the piston 102. The piston cradle 260 further includes a frustoconical upper surface 262 that reduces the diameter of the space receiving the piston from the nominal internal diameter of the shaft 104 (e.g., the inner diameter of the liner 154) to the diameter of the socket 263.

The piston cradle 260 also provides protection against a failure in the passage 110 (e.g., a valve or mechanism such as the pump-turbine 120) that suddenly allows unrestricted flow of fluid through the passage 110. As the piston 102 approaches the shaft floor 156 it will begin to block flow into the lower cross passage 118, acting in effect as a gate valve. The piston cradle 260 is configured such that a small space 264 remains between the aperture 266 to the lower cross passage 118 and the piston 102 to allow a small flow rate of fluid into and out of the lower cross passage 118 even when the piston 102 has completely descended, allowing the rise and fall of the piston 102 during normal operations.

The shape of the aperture 266 to the lower cross passage 118 can be configured such that the flow rate into the passage 110 will decrease smoothly as the piston 102 descends, reducing the acceleration of the piston 102 in a controlled manner and minimizing the force of impact between the piston 102 and the shaft floor 156. For example, instead of round, the aperture 266 may be configured as a vertical slot or a V-shape. The surface of the aperture 266 is configured to be a durable material, such as stainless steel, to avoid deterioration from long exposure to the working fluid or erosion from high pressure flow. The structure of the lower cross passage 118 and the piston cradle 260 are sufficiently strong to withstand any increase in pressure that occurs as the piston descends. In other embodiments, the lower cross passage 118 can be positioned such that the aperture 266 is disposed above the piston cradle 260.

Piston Guide

Figure 21:
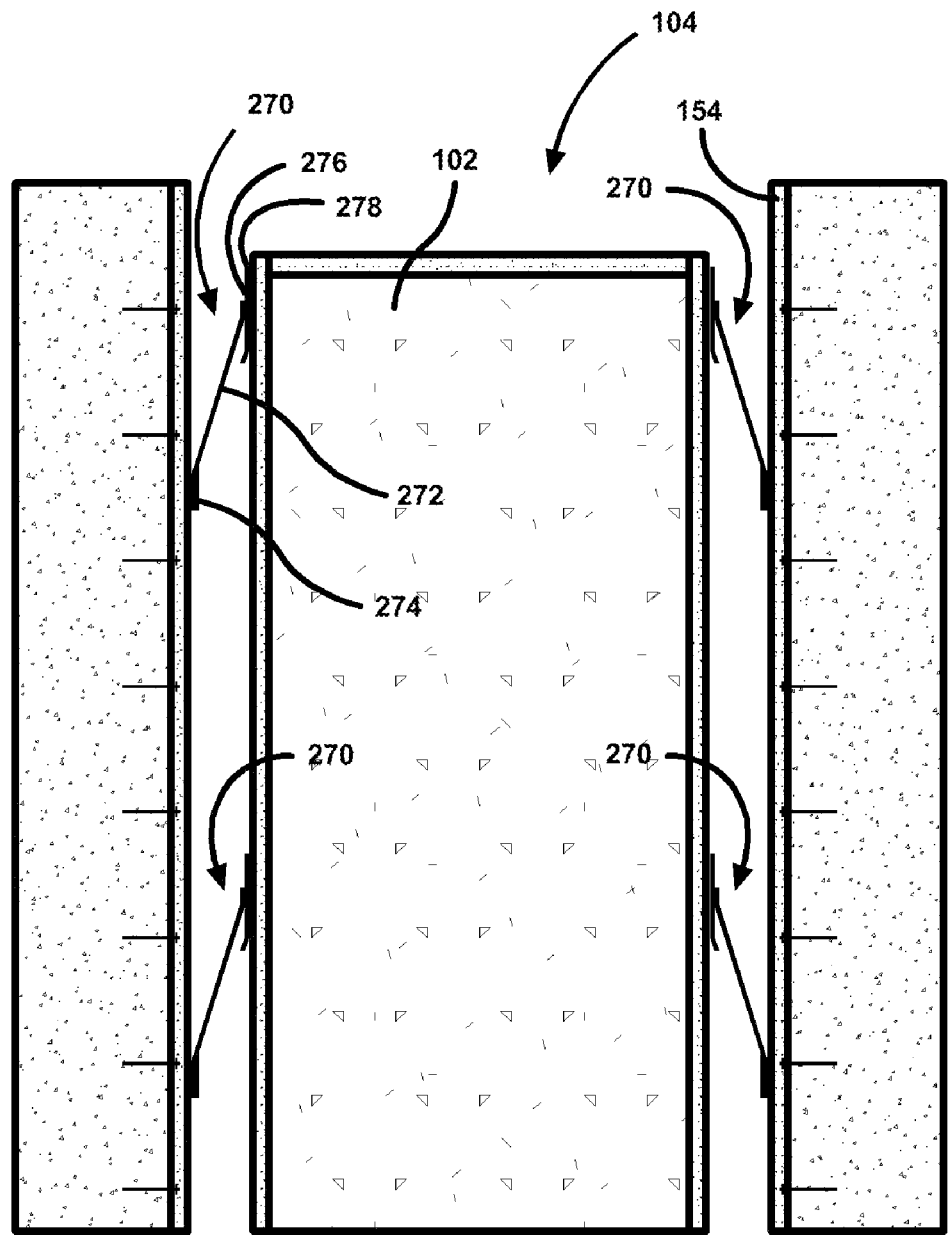
FIG. 21 is a cross-section view of the energy storage system of FIG. 3, illustrating piston guides, according to an exemplary embodiment.
Figure 22:
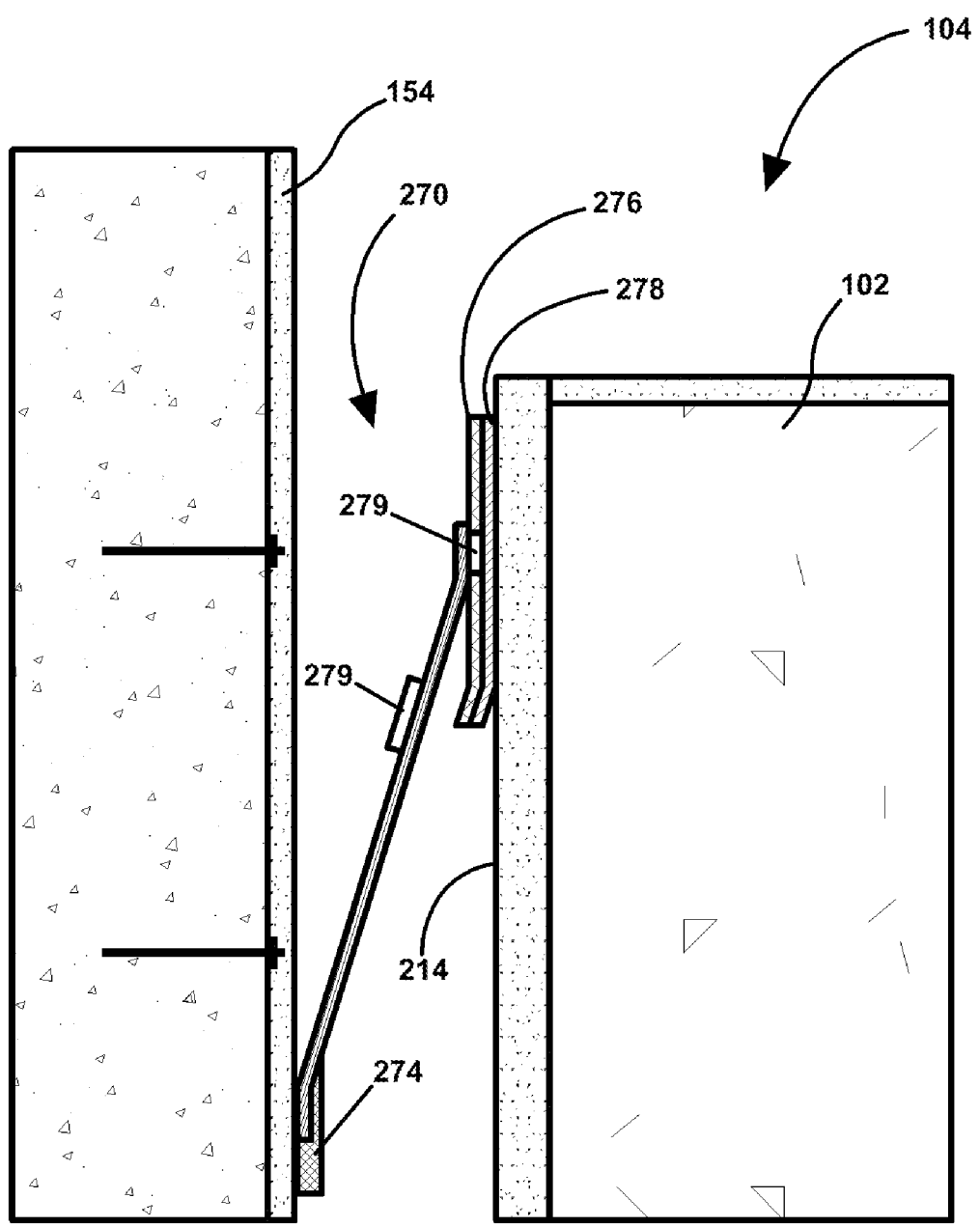
FIG. 22 is a detail cross-section view of the piston guides of FIG. 21.

Referring now to FIGS. 21-22, alignment members, shown as piston guides 270 are provided at elevation intervals in the space between the piston 102 and the walls of the shaft 104. The piston guides 270 constrain the tilt or lateral movement of the piston 102 to maintain the piston 102 in a vertical orientation and centered in the shaft 104. By aligning the piston 102 within the shaft 104, the piston guides 270 prevent damage to the seal assembly 130, the liner 154, or the piston 102 and a decrease in system efficiency due to friction caused by misalignment or contact between the piston 102 and the walls of shaft 104. The piston guides 270 are configured to keep the piston 102 centered in the shaft 104 and prevent an uncontrolled drop even in the event of a failure of the seal assembly 130, thereby decreasing the potential for catastrophic failure and increasing operational flexibility of the energy storage system 100.

According to an exemplary embodiment, the piston guide 270 includes a flexing strut 272. An end of the strut 272 is received in a pocket 274 that is provided on the liner 154. The piston guide 270 may include multiple struts 272 arranged next to each other around the circumference of the piston 102. The strut 272 can be fabricated of strong, resilient material such as carbon fiber composite or a metal or metal alloy (e.g., stainless steel) that is resistant to corrosion when submerged in the working fluid.

The strut 272 extends inward across the gap between the wall of the shaft 104 to the piston 102, the free inner end is coupled to a support plate 276, which backs a contact pad 278. The strut 272 presses the support plate 276 and the contact pad 278 against the side of the piston 102, sliding along the outer surface 214 of the piston 102. Both the support plate 276 and the contact pad 278 are curved to conform to the curvature of the piston 102 (see FIG. 24). The contact pad 278 is fabricated of a low friction material with high enough compressive strength to tolerate any expected level of pressure, such as ultra-high molecular weight polyethylene or Vesconite. The support plate 276 is formed of a rigid material, such as a metal or alloy (e.g., stainless steel).

The strut 272 presses the support plate 276 and the contact pad 278 against the side of the piston 102 such that minimal force is applied as long as the piston 102 remains centered in the shaft 104. If the piston 102 deviates from that center position in the direction of the guide 270, the strut 272 flexes and the contact pressure applied to the piston 102 by the contact pad 278 increases, forcing the piston 102 back to the center of the shaft 104.

The contact pad 278 has a large enough surface area to provide the capability for high force with low pressure. For example, in one embodiment, the contact pad may have a width of 100 inches and a height of 100 inches and is therefore able to provide a centering force of 100,000 pounds (>45,000 kgf) with an applied contact pressure of only 10 pounds per square inch. If applied before piston tilt becomes too large, such a force is more than adequate to keep even a very large piston close to vertical and thus avoid the need for even larger lateral forces. In some embodiments, the piston guide 270 may include one or more measurement devices 279 (e.g., pressure sensors, strain gauges, etc.). The measurement devices 279 may be disposed on the support plate 276 or on the strut 272 to detect lateral movement of the piston 102. The measurement devices 279 can be monitored remotely to verify correct operation of the energy storage system 100 and allow corrective action before any structural failure causes severe damage.

The strut 272, the support plate 276, and the contact pad 278 can be removed from the pocket 274 as a unit (e.g., hoisted by an overhead crane mechanism) for maintenance or replacement and to clear the gap between the piston 102 and wall of the shaft 104 to allow the seal assembly 130 to be removed, as described above. The piston guide 270 can be removed without removing the working fluid from the energy storage system 100.

Figure 23:
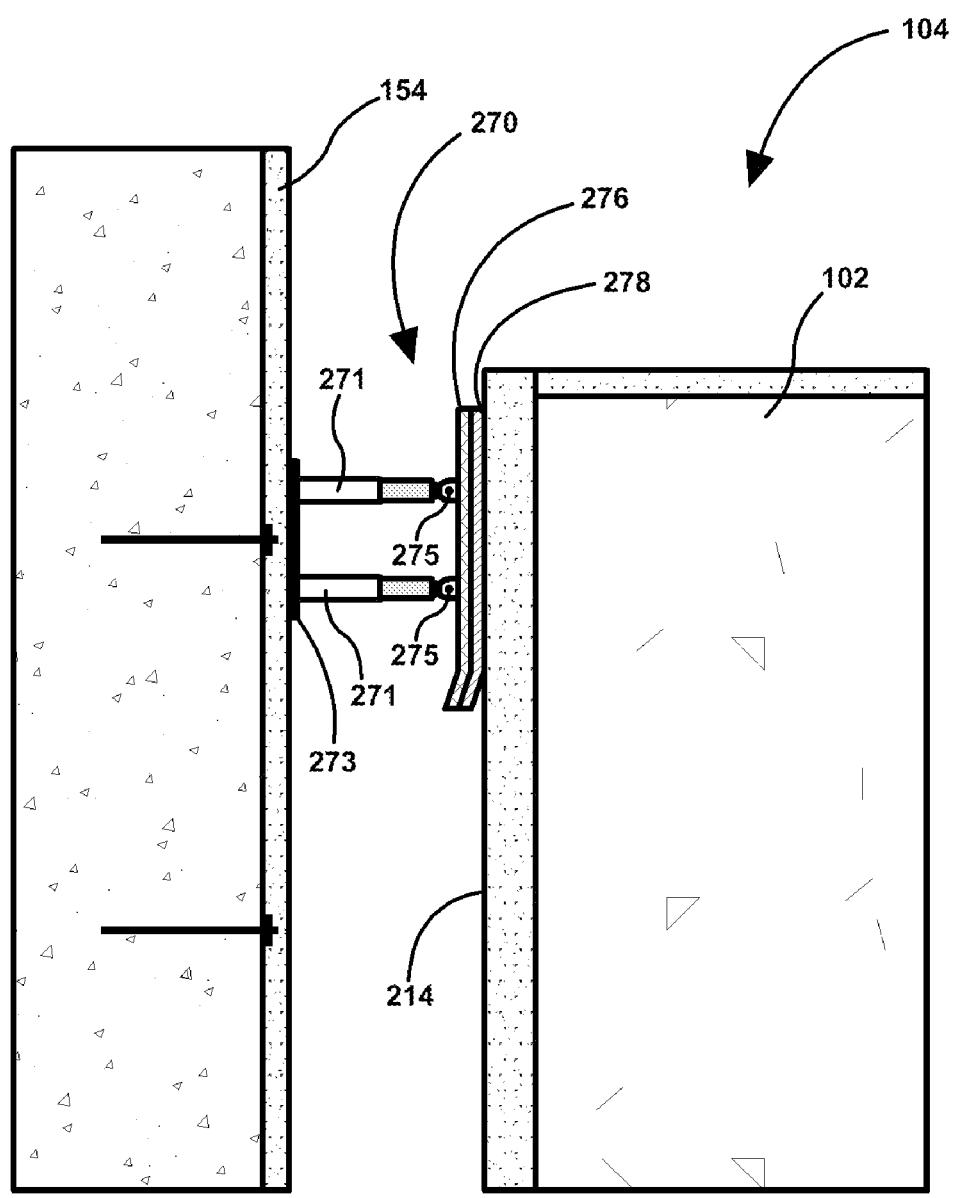
FIG. 23 is a cross-section view of the energy storage system of FIG. 3, illustrating piston guides, according to another exemplary embodiment.
Figure 24:
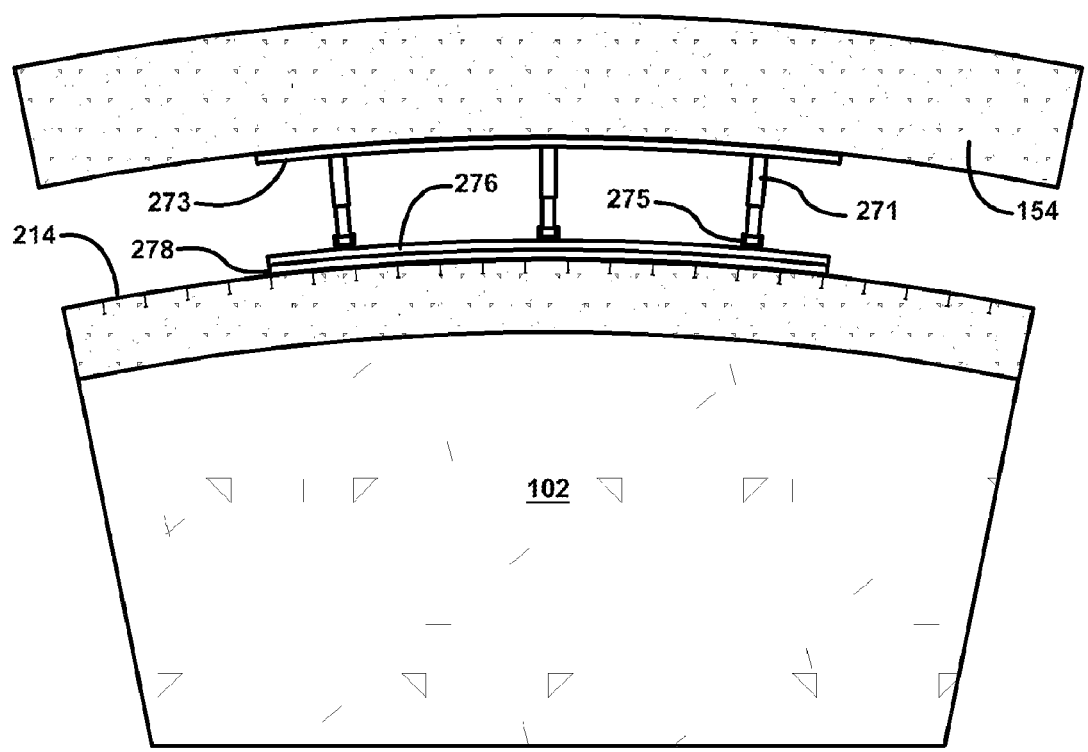
FIG. 24 is a top view of the piston guide of FIG. 23.

Referring now to FIGS. 23-24 the piston guide 270 is shown according to another exemplary embodiment. Instead of the strut 272, the piston guide 270 includes a hydraulic piston 271. The hydraulic piston 271 is coupled to a plate 273 disposed on the liner 154 and extends inward across the gap between the wall of the shaft 104 to the piston 102. The free inner end is coupled to the support plate 276 with a pivoting connection 275. The hydraulic piston 271 presses the support plate 276 and the contact pad 278 against the side of the piston 102. The pivoting connection 275 allows the support plate 276 and the contact pad 278 to maintain contact with the piston 102 if it deviates from the center position. If the piston 102 deviates from that center position in the direction of the guide 270, the hydraulic piston 271 compresses and the contact pressure applied to the piston 102 by the contact pad 278 increases, forcing the piston 102 back to the center of the shaft 104. In other embodiments, the hydraulic piston 271 may be replaced with another suitable mechanism, such as a pneumatic piston or a spring device (e.g., a coil spring). Referring to FIG. 24, the piston guide 270 may include multiple hydraulic pistons 271 arranged radially about a portion of the circumference of the piston 102. The pressure of the hydraulic piston can be increased by means of a pump (not shown) to force the piston back toward the center of the shaft, or decreased to minimize friction between the piston 102 and the contact pad 278.

Particle Trap

Figure 25:
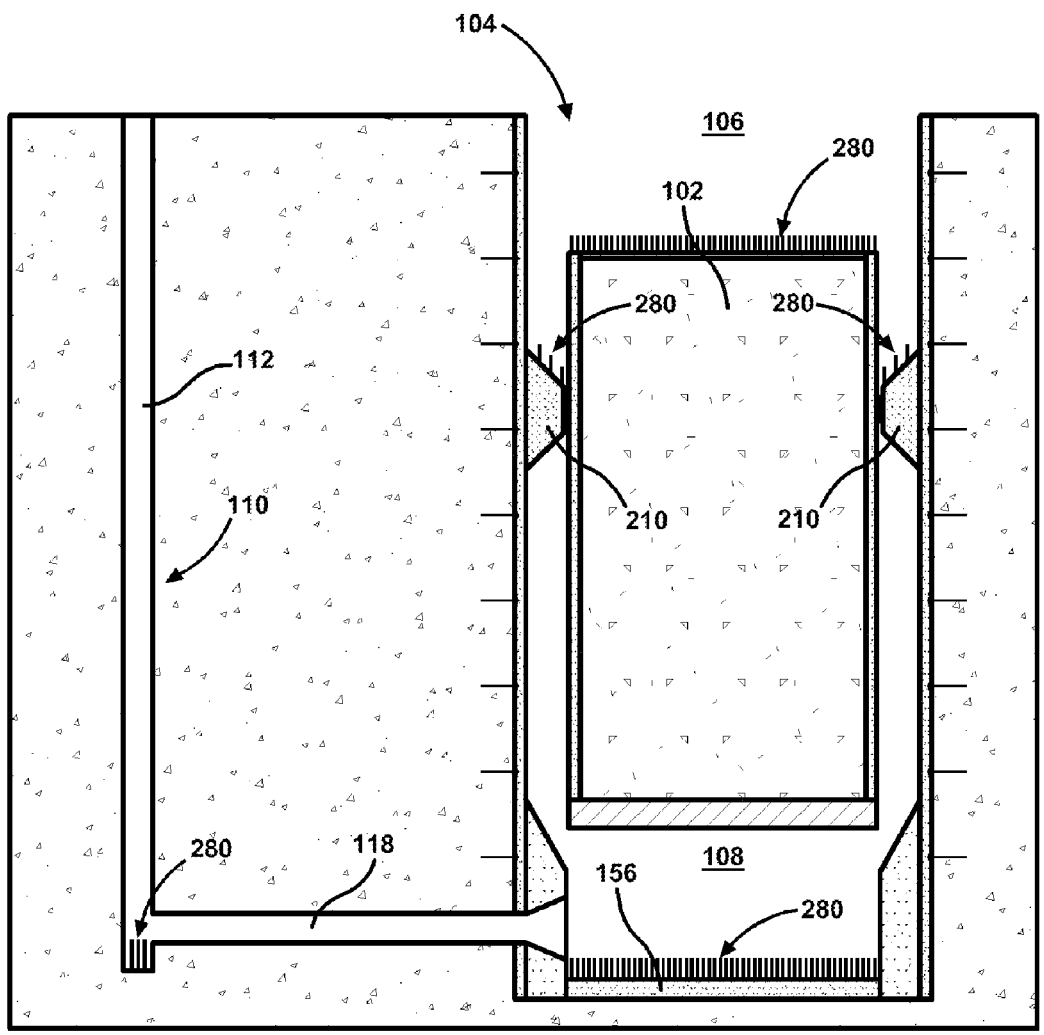
FIG. 25 is a cross-section view of the energy storage system of FIG. 3, illustrating several particle traps according to an exemplary embodiment.

Referring now to FIG. 25, the energy storage system 100 is shown to include one or more particle traps 280. Particulates remaining from the construction of the energy storage system 100 or produced by deterioration of the piston 102 or the walls of the shaft 104 can flow through the energy storage system 100 and cause abrasive damage to components, such as the pump-turbine 72 and the seal assembly 130. The construction methods described previously are configured to minimize the release of such particles from the wall of the shaft 104 or the piston 102. However, abrasive particles may still result from the construction of the piston 102 and the shaft 104 or may be introduced into the energy storage system 100 from other sources, such as with the working fluid used to fill the energy storage system. The particle traps 280 are configured to prevent abrasive particulates from freely flowing through the energy storage system 100 and damaging components.

The particle traps 280 are provided by structures such as vertical passages that allow particles to settle into collection areas while preventing turbulence in the working fluid from carrying the particles away from the particle traps 280 to other areas of the energy storage system 100. The particle traps may be provided, for example, on the top of the piston 102, the top of the seal assembly mount 210, the shaft floor 156, and the bottom end of the vertical passage 112. During operation of the energy storage system 100, abrasive particles in the working fluid will tend to settle into one of the particle traps 280 and remain in the particle traps 280 until removed during maintenance of the energy storage system 100.

Power Generation

Figure 26:
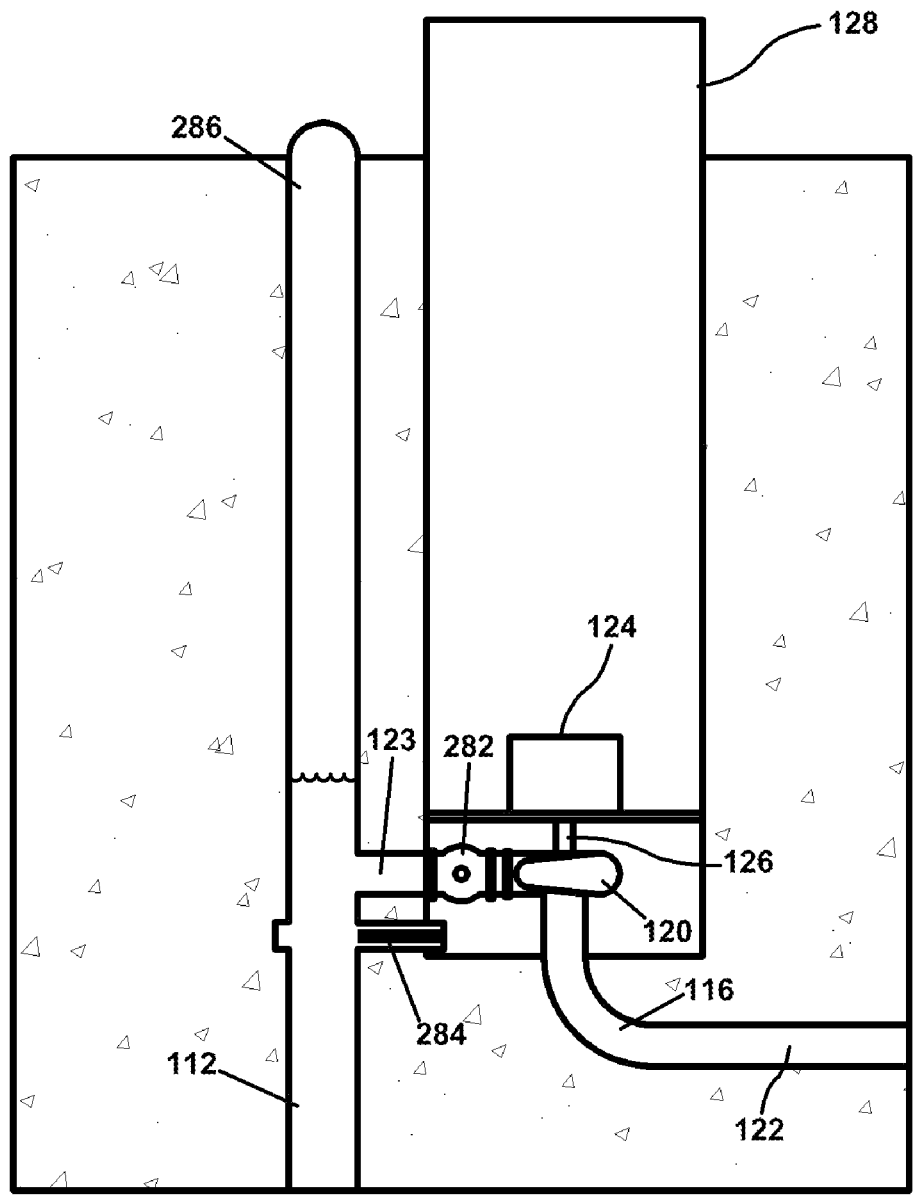
FIG. 26 is a detail cross-section view of power house for the energy storage system of FIG. 3, according to an exemplary embodiment.

Referring now to FIG. 26, the power house 128 is shown in more detail. A main valve 282 is disposed in the second portion 123 of the upper cross passage 116 between the pump-turbine 120 and the vertical passage 112. According to an exemplary embodiment, the main valve 282 is a spherical valve similar to a valve commonly used in hydropower systems. A second valve 284 is disposed in the vertical passage 112 below the aperture of the upper cross passage 116. According to an exemplary embodiment, the second valve 284 is a gate valve. The second valve 284 can close the vertical passage 112 to prevent fluid flow from the shaft 104 to allow maintenance to the vertical passage 112 or to the power house 128, for example, or to prevent working fluid from escaping through a leak in the upper portion of the vertical passage 112. The top end of the vertical passage, above the connection to the upper cross passage 116, may contain air and form a surge chamber 286. The air in the surge chamber 286 provides a cushion in response to rapid changes in pressure in the working fluid, to mitigate water hammer. In case of damage or a malfunction of the main valve 282 or the pump-turbine 120, an additional fluid passage (not shown) from the vertical passage 112 to the shaft 104 may be provided. The additional fluid passage allows working fluid to bypass the power house 128, lowering the piston 102 and relieving pressure in the working fluid.

Figure 27:
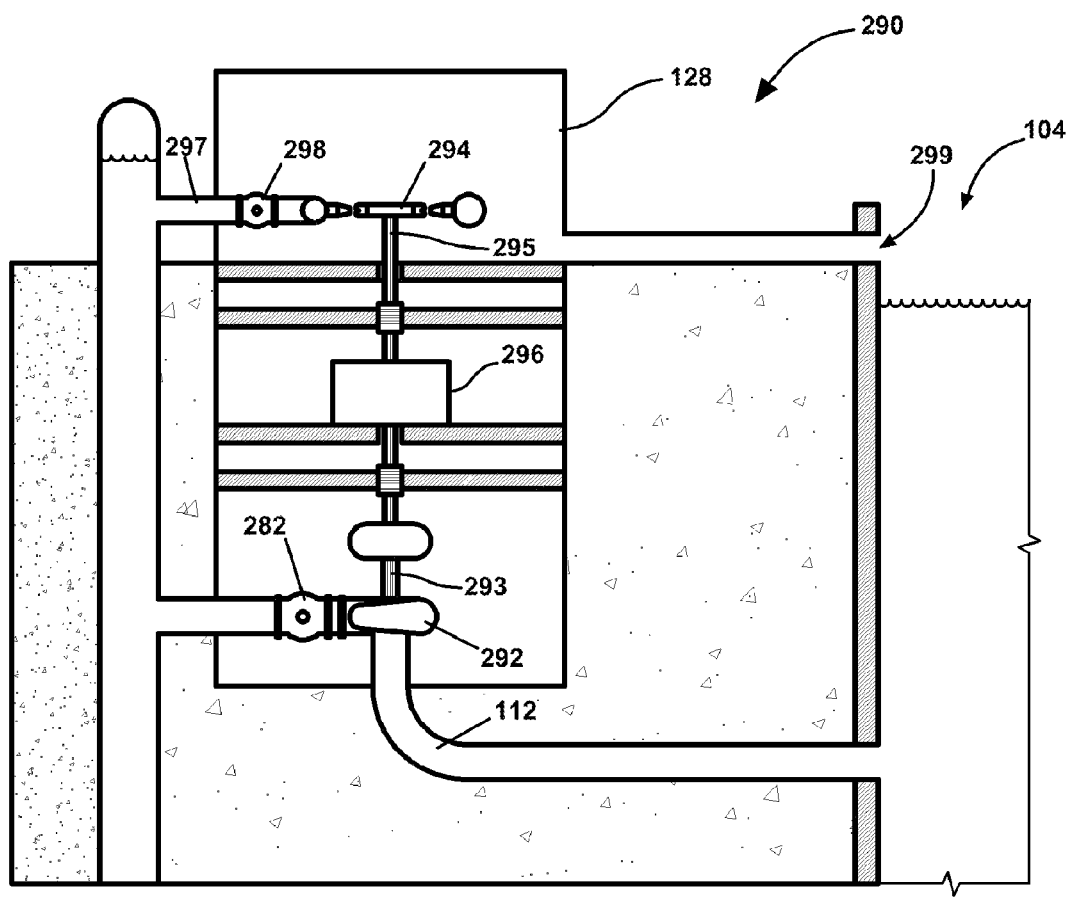
FIG. 27 is a detail cross-section view of the power house for the energy storage system of FIG. 3, according to another exemplary embodiment.

Referring now to FIG. 27, in another embodiment, the energy storage system 100 may include a hydraulic short circuit power system 290. Instead of a pump-turbine, the hydraulic short circuit power system 290 includes separate pump 292 and a turbine 294 (e.g., a Pelton turbine). The pump 292 and the turbine 294 are connected to a common motor/generator 296 by drive shafts 293 and 295, respectively. The pump 292 is disposed in the upper cross passage 112. The turbine 294 is disposed in a third passage 297 in fluid communication with the vertical passage 112 and having an outlet 299 emptying into the shaft 104. The turbine 294 is positioned above the level of the working fluid in the shaft 104. A valve 298 (e.g., a spherical valve) is disposed in the third passage 297 between the turbine 294 and the vertical passage 112.

The pump 292 may have a high power requirement (e.g., approximately 300 megawatts) and may be capable only of storing power in the energy storage system 100 at this power level. The turbine 294, by contrast, may be capable of providing output power from the energy storage system 100 over virtually the entire range from zero to full power. The hydraulic short circuit power system 290 can overcome the pumping power limitation by operating the pump 292 and the turbine 294 simultaneously. The pump 292 may be operated at full power while some of the high pressure water output by the pump 292 is channeled through the turbine 294 by partially opening the valve 298 to generate some of the power required by the pump 292.

Because the turbine 294 is positioned above the working fluid level of the shaft 104, the working fluid from the outlet 299 can flow freely into the shaft 104, without the need of a pressure housing or a pressurized turbine chamber, as would be needed if the turbine 294 was positioned below the working fluid level of the shaft 104. Positioning the turbine 294 above the working fluid level of the shaft 104 may result in the turbine 294 being above ground level, facilitating the installation and maintenance of the turbine 294.

Thus, the hydraulic short circuit power system 290 can be smoothly and rapidly varied from full pumping power to zero pumping power, simply by varying turbine power. This greatly increases the utility of the energy storage system 100 in grid systems where variable power sources, such as wind and solar, can rapidly change the amount of power that must be stored or generated.

While the energy storage systems described above are described in general as using water as a working fluid, in other embodiments, another fluid may be used. For example, the fluid may be another liquid or may be air or some other gas could be used in place of water. If a gas is used as the working fluid, the pump-turbine may be replaced with a compressor-turbine. If compressed gas is used as the working fluid instead of water, the quantity of energy that can be stored with a given shaft and piston is even larger, as energy is stored both by lifting the piston and by compressing the gas.

Embodiments of the present invention are directed to energy storage systems that can serve as reliable, dispatchable power supplies. In particular embodiments, the systems may harness energy produced by renewable sources, such as that collected by solar collectors and wind turbines. According to embodiments of the present invention, a significant fraction of the output from solar and/or wind sources is directed into large-scale energy storage units, which may then release that energy at a later time (e.g., on an as-needed basis).

Although certain embodiments that have been described above are directed to systems by which "off-peak" energy is stored for subsequent "peak" usage, embodiments of the invention are also directed to systems for frequency regulation, or regulation, of energy generation. In such systems, differences between the levels of the energy generated and the levels of energy demanded are balanced to reduce or minimize such differences. According to such embodiments, the path along which a piston (e.g., a piston similar to piston 102 of FIG. 3) may travel may have a suitable vertical length such as, but not limited to, a length of around 200 meters or more. In a particular embodiment, the vertical length of the path is between approximately 200 meters and 400 meters.

The foregoing description of certain embodiments of the invention has been presented for the purposes of illustration and description. It is not intended to be exhaustive or to limit the invention to the precise form disclosed. Many modifications and variations are possible in light of the above teachings. Therefore, it is intended that the scope of the invention be limited not by this detailed description, but rather by the claims appended hereto.

What is claimed is:

1. A system for storing energy, the system comprising:
   a body;
   a hollow shaft having at least one wall defining an internal volume for containing a fluid, the body being disposed within the internal volume of the hollow shaft for movement with gravity from a first elevation position to a second elevation position within the internal volume of the hollow shaft;
   a seal member disposed between the body and the at least one wall of the hollow shaft, the seal member being coupled to a mounting surface and slidably engaging a contact surface to divide the internal volume into a first portion located vertically below the body and a second portion located vertically above the body;
   a fluid passage in fluid communication with the hollow shaft, for communicating fluid with the first portion of the interior volume of the hollow shaft;
   and an electrical energy motor/generator operatively coupled with the fluid passage to drive the electrical energy motor/generator to generate electricity upon movement of the body with gravity from the first elevation position to the second elevation position;
   wherein the seal member is mounted to a seal carrier, the seal carrier being coupled to the mounting surface such that it can move in a direction lateral to the motion of the body between the first position and the second position and, the seal carrier having a circumference being able to expand or contract.

2. The system of claim 1, wherein the contact surface comprises a smooth, vertical surface.

3. The system of claim 2, wherein the contact surface has a verticality within ±100 mm.

4. The system of claim 2, wherein the contact surface has an average roughness of less than 0.5 μm.

5. The system of claim 1, wherein the wall of the hollow shaft comprises the mounting surface and an outer circumferential surface of the body comprises the contact surface, the seal member continually engaging the body as the body moves between the first position and the second position.

6. The system of claim 1, wherein seal carrier comprises a vertical surface, the fluid in the first portion of the internal volume exerting an inward force on the vertical surface to force the seal member against the contact surface.

7. The system of claim 1, wherein the seal member is configured to be removable from between the body and the wall of the hollow shaft without removing the fluid from the internal volume of the hollow shaft.

8. The system of claim 1, further comprising a turbine in fluid communication with the fluid passage and mechanically coupled to the electrical energy motor/generator, the turbine receiving fluid pressure from the fluid passage and driving the electrical energy motor/generator to generate electricity upon movement of the body by gravity from the first elevation position to the second elevation position.

9. The system of claim 8, further comprising a fluid pump in fluid communication with the fluid passage and mechanically coupled to the electrical energy motor/generator, the fluid pump being driven by the electrical energy motor/ generator and adding fluid pressure to the fluid passage to store energy by moving the body from the second elevation position to the first elevation position.

10. The system of claim 9, wherein the turbine is positioned above the fluid level of the fluid contained within the hollow shaft.

11. The system of claim 10, further comprising a cutoff valve disposed in the passage between the fluid pump and the first chamber.

12. The system of claim 11, further comprising a second valve disposed in the passage between the turbine and the first chamber.

13. The system of claim 1, wherein the body and the wall of the hollow shaft are substantially impermeable by the fluid contained within the internal volume.

14. A system for storing energy, the system comprising:
a body;
a hollow shaft having at least one wall defining an internal volume for containing a fluid, the body being disposed within the internal volume of the hollow shaft for movement with gravity from a first elevation position to a second elevation position within the internal volume of the hollow shaft;
a seal member disposed between the body and the at least one wall of the hollow shaft, the seal member being coupled to a mounting surface and slidably engaging a contact surface to divide the internal volume into a first portion located vertically below the body and a second portion located vertically above the body;
a fluid passage in fluid communication with the hollow shaft, for communicating fluid with the first portion of the interior volume of the hollow shaft;
an electrical energy motor/generator operatively coupled with the fluid passage to drive the electrical energy motor/generator to generate electricity upon movement of the body with gravity from the first elevation position to the second elevation position; and
a cradle disposed in the internal volume of the hollow shaft, the cradle comprising an inner surface defining a socket, the socket configured to receive a lower portion of the body;
wherein the cross-sectional area of a space between the body and the inner surface is less than the cross-sectional area of a space between the body and the wall of the hollow shaft.

15. A system for storing energy, the system comprising:
a body;
a hollow shaft having at least one wall defining an internal volume for containing a fluid, the body being disposed within the internal volume of the hollow shaft for movement with gravity from a first elevation position to a second elevation position within the internal volume of the hollow shaft;
a seal member disposed between the body and the at least one wall of the hollow shaft, the seal member being coupled to a mounting surface and slidably engaging a contact surface to divide the internal volume into a first portion located vertically below the body and a second portion located vertically above the body;
a fluid passage in fluid communication with the hollow shaft, for communicating fluid with the first portion of the interior volume of the hollow shaft;
an electrical energy motor/generator operatively coupled with the fluid passage to drive the electrical energy motor/generator to generate electricity upon movement of the body with gravity from the first elevation position to the second elevation position; and
a plurality of alignment members disposed about the periphery of the body; the alignment members being coupled to the wall of the hollow shaft and slidably engaging the outer circumferential surface of the body; wherein the alignment members apply a force to the body in a direction towards the center of the hollow shaft to maintain a gap between the outer circumferential surface of the body and the wall of the hollow shaft to constrain the movement of the body in direction lateral to the motion of the body between the first position and the second position.

16. The system of claim 15, wherein the alignment members are configured to be removable from between the body and the wall of the hollow shaft without removing the fluid from the internal volume of the hollow shaft.

17. The system of claim 15, further comprising a measurement device disposed on one of the plurality of alignment members, the measurement device configured to detect movement of the body in a direction lateral to the motion of the body between the first position and the second position.

18. The system of claim 15, wherein the force applied to the body by the plurality of alignment members can be controllably increased or decreased.

* * * * *